US010995849B2

(12) United States Patent
Igarashi et al.

(10) Patent No.: US 10,995,849 B2
(45) Date of Patent: May 4, 2021

(54) OPERATION DEVICE AND VEHICULAR SHIFTING APPARATUS USING OPERATION DEVICE

(71) Applicant: ALPS ALPINE CO., LTD., Tokyo (JP)

(72) Inventors: Yu Igarashi, Miyagi (JP); Takashi Uenomachi, Miyagi (JP); Toshio Ogawa, Miyagi (JP); Yoshitsugu Wakita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 230 days.

(21) Appl. No.: 16/433,323

(22) Filed: Jun. 6, 2019

(65) Prior Publication Data

US 2019/0285170 A1 Sep. 19, 2019

Related U.S. Application Data

(63) Continuation of application No. PCT/JP2017/043233, filed on Dec. 1, 2017.

(30) Foreign Application Priority Data

Dec. 15, 2016 (JP) ............................ JP2016-243115

(51) Int. Cl.
*F16H 59/10* (2006.01)
*F16H 61/24* (2006.01)
(Continued)

(52) U.S. Cl.
CPC ............ *F16H 59/10* (2013.01); *B60K 20/02* (2013.01); *F16H 61/24* (2013.01); *F16H 63/304* (2013.01);
(Continued)

(58) Field of Classification Search
None
See application file for complete search history.

(56) References Cited

U.S. PATENT DOCUMENTS 5,677,658 A * 10/1997 Osborn .................. F16H 59/10 192/222
5,718,312 A * 2/1998 Osborn .................. F16H 59/10 192/220.4
(Continued)

FOREIGN PATENT DOCUMENTS

EP 1615250 1/2006
JP H09-071094 3/1997
(Continued)

OTHER PUBLICATIONS

International Search Report for PCT/JP2017/043233 dated Jan. 30, 2018.

*Primary Examiner* — William Kelleher
*Assistant Examiner* — Gregory T Prather
(74) *Attorney, Agent, or Firm* — IPUSA, PLLC

(57) ABSTRACT

A first movable member for pivotally shifting to a predetermined position in conjunction with a pivotal operation of a shift lever, and a permanent magnet section disposed so as to face the first movable member are included whereby the shift lever is provided with a click feeling given by an attraction force acting between the first movable member and the permanent magnet section. The permanent magnet section is magnetized such that in a thickness direction, an N pole and an S pole are created by magnetization in a series arrangement, and such that in a width direction, an S pole is created by magnetization alongside the N pole and an N pole is created by magnetization alongside the S pole created by magnetization in the thickness direction.

9 Claims, 18 Drawing Sheets

D1 D2 D3 1 10A 13A 4A 8A 2 3 17B 15D 8A 4A 13A 15A 9C 22 4 7 8D 4B 9A 21 10B 10A 15B 15a 16 15 14A 12 17A 13D 30b 4B 15C 14C 10B 7 14A 9A 12

(51) Int. Cl.

| | |
|---|---|
| ***G05G 5/03*** | (2008.04) |
| ***F16H 63/30*** | (2006.01) |
| ***G05G 25/00*** | (2006.01) |
| ***G05G 1/04*** | (2006.01) |
| ***B60K 20/02*** | (2006.01) |

(52) U.S. Cl.
CPC ................ *G05G 1/04* (2013.01); *G05G 5/03* (2013.01); *G05G 25/00* (2013.01); *F16H 59/105* (2013.01); *F16H 2061/241* (2013.01)

(56) References Cited

U.S. PATENT DOCUMENTS

| | | | | |
|---|---|---|---|---|
| 5,759,132 | A * | 6/1998 | Osborn | F16H 59/10<br>192/220.4 |
| 5,774,042 | A * | 6/1998 | Johnston | B60K 26/021<br>200/61.89 |
| 5,775,166 | A * | 7/1998 | Osborn | F16H 59/10<br>192/220.3 |
| 6,209,408 | B1 * | 4/2001 | DeJonge | F16H 59/044<br>74/335 |
| 6,923,083 | B2 * | 8/2005 | Fujinuma | F16H 59/0204<br>74/473.23 |
| 8,330,454 | B2 * | 12/2012 | Furuki | G01D 5/145<br>324/207.22 |
| 2004/0035237 | A1 * | 2/2004 | Matsui | F16H 59/105<br>74/473.12 |
| 2004/0226801 | A1 * | 11/2004 | De Jonge | F16H 59/0204<br>192/220.7 |
| 2008/0042644 | A1 * | 2/2008 | Heo | F16H 59/105<br>324/207.2 |
| 2012/0187940 | A1 * | 7/2012 | Uhlenbruck | F16H 61/22<br>324/207.11 |
| 2013/0025398 | A1 * | 1/2013 | Choi | F16H 59/0217<br>74/473.12 |
| 2015/0025761 | A1 * | 1/2015 | Kernebeck | F16H 59/105<br>701/60 |
| 2015/0048816 | A1 * | 2/2015 | Derouet | F16H 59/044<br>324/207.2 |
| 2016/0102761 | A1 * | 4/2016 | Kuwahara | F16H 61/28<br>74/473.12 |
| 2016/0186858 | A1 * | 6/2016 | Park | H02K 41/0356<br>74/473.3 |
| 2017/0009876 | A1 * | 1/2017 | Uenomachi | F16H 59/105 |
| 2017/0191561 | A1 * | 7/2017 | Seibold | F16H 59/044 |
| 2017/0307072 | A1 * | 10/2017 | Yamada | F16H 61/32 |
| 2017/0313407 | A1 * | 11/2017 | Crandall-Seibert | G05G 1/04 |
| 2017/0343103 | A1 * | 11/2017 | Recio | F16H 59/044 |
| 2017/0356543 | A1 * | 12/2017 | Turney | F16H 59/0204 |
| 2018/0038478 | A1 * | 2/2018 | Arakawa | B60K 20/08 |
| 2018/0340607 | A1 * | 11/2018 | Uenomachi | G05G 1/04 |
| 2019/0154144 | A1 * | 5/2019 | Kim | F16H 59/0204 |
| 2019/0248235 | A1 * | 8/2019 | Igarashi | G05G 5/06 |
| 2020/0103022 | A1 * | 4/2020 | Mendoza-Vega | F16H 61/24 |

FOREIGN PATENT DOCUMENTS

| | | |
|---|---|---|
| JP | 2002-144905 | 5/2002 |
| JP | 2012-050555 | 3/2012 |
| JP | 2016-206787 | 12/2016 |
| WO | 2007/009744 | 1/2007 |

* cited by examiner

OPERATION DEVICE AND VEHICULAR SHIFTING APPARATUS USING OPERATION DEVICE

CROSS-REFERENCE TO RELATED APPLICATION

This application is a continuation application of International Application No. PCT/JP2017/043233 filed on Dec. 1, 2017, and designated the U.S., which is based upon and claims the priority to Japanese Patent Application No. 2016-243115, filed on Dec. 15, 2016, the entire contents of which are incorporated herein by reference.

BACKGROUND OF THE INVENTION

1. Field of the Invention

The present disclosure relates to an operation device in which an operation member is operably moved to a plurality of positions by a pivotal operation of an operation member, and a vehicular shifting apparatus using the operation device. In particular, the present disclosure relates to an operation device and a vehicular shifting apparatus that are pivotally shifted.

2. Description of the Related Art

In general, an operation device, in which an operation member is moved to a plurality of positions by a pivotal operation of an operation member, is used by a remote controller of various electronic devices such as a television set and a video device, an input device of a game system, a vehicular shifting apparatus or the like. For the vehicular shifting apparatus, in order to improve a click feeling given when an operation member is pivotally shifted, the operation member is pivotally shifted with the click feeling.

Japanese Laid-open Patent Publication No. 2002-144905 (Patent Document 1) discloses a shift manipulating device for an automatic transmission in which a shift lever used as an operation member is pivotally shifted with a click feeling.

In the shift manipulating device for the automatic transmission, when the shift lever supported by a holder is swingably operated, the shift lever is operably moved to each position of a P range (Parking range), R range (Reverse range), N range (Neutral range) and a D range (Drive range).

When the shift lever is swingably operated, a control body provided on a holder is pressed to a control groove formed in a bottom portion of the holder, by a control spring (coil spring). The control body is pressed to the control groove by a biasing force of the control spring, so that the click feeling is given when the shift lever is moved to each position.

However, in the techniques disclosed in Patent Document 1, in order to provide the click feeling, the control body is configured to slide with respect to the control groove. If the shift lever is repeatedly operated to be swung, this may result in a durability problem such as abrasion of the control groove or the control spring, deterioration of spring properties of the control spring, or a backlash in the control spring and the control body.

SUMMARY OF THE INVENTION

The present disclosure provides an operation device, which has excellent durability and a high click sensitivity with respect to an operation member, and a vehicular shifting apparatus using the operation device.

In a first aspect, an operation device according to the present disclosure that includes an operation member and a support for pivotally supporting the operation member, the support being formed of a non-magnetic member, and the operation member being configured to be pivotally shifted to a predetermined position with a click feeling, the operation device comprising; a first movable member supported by the support so as to be in conjunction with a pivotal operation of the operation member; a first magnetic body provided with the first movable member; and a permanent magnet section supported by the support so as to face the first magnetic body when the operation member is at an operation reference position, wherein the permanent magnet section is magnetized such that an N pole and an S pole are created by magnetization in a series arrangement in a thickness direction pointing to the first magnet body, and such that in a width direction intersecting the thickness direction, an S pole is created by magnetization alongside the N pole and an N pole is created by magnetization alongside the S pole created by magnetization in the thickness direction, wherein the operation member is retained at the operation reference position by an attraction force acting between the first magnetic body and the permanent magnet section when the operation member is at the operation reference position, and wherein the movable member positions the first magnetic body away from the permanent magnet section against the attraction force acting between the first magnetic body and the permanent magnet section when the operation member is pivotally shifted from the operation reference position to a first step position, so that the operation member is pivotally shifted to a predetermined position.

According to this configuration, a click feeling is given by a force of moving the first magnetic body away from the permanent magnet section against the attraction force acting between the first magnetic body and the permanent magnet section, and such a click feeling is provided by the operation member. Also, in the permanent magnet section, the N pole and the S pole created by magnetization in the width direction are close together, and thus density of magnetic flux is increased in a portion in proximity to the N pole and the S pole. Thereby, the magnetic flux efficiently affects the first magnetic body, so that the attraction force between the magnetic body and the permanent magnet section is increased.

In a second aspect, according to the first aspect, the permanent magnet section may include an individual first permanent magnet in which the N pole and the S pole are created by magnetization in the series arrangement in the thickness direction, and include an individual second permanent magnet, disposed alongside the first permanent magnet, in which an N pole and an S pole are created by magnetization in a series arrangement in an order opposite the N pole and the S pole, created by magnetization.

According to this configuration, as the permanent magnet section, individual permanent magnets are used, thereby easily performing a magnetization process.

In a third aspect, according to the second aspect, in each of the first permanent magnet and the second permanent magnet, the N pole and the S pole may be created by magnetization in the series arrangement in the thickness direction, and the first permanent magnet and the second permanent magnet are arranged in parallel, such that the N poles and S poles are arranged opposite with respect to each other in the thickness direction.

According to this configuration, permanent magnets common to the first permanent magnet and the second permanent magnet are used, thereby reducing the cost of components.

In a fourth aspect, according to the second or third aspect, the first permanent magnet and the second permanent magnet may be held in parallel in a magnet holding section mounted on the support.

According to this configuration, the first permanent magnet and the second permanent magnet are held in the magnet holding section in a state of attracting each other in the width direction.

In a fifth aspect, according to the fourth, the magnet holding section may be formed such that a first magnet holding section and a second magnet holding section are separated by a partition-wall section, and on the respective opposite sides of the support, a first magnet-insertion opening for inserting the first permanent magnet into the first magnet holding section is formed, and a second magnet-insertion opening for inserting the second permanent magnet into the second magnet holding section is formed. In a state in which the first permanent magnet and the second permanent magnet attract each other in the width direction through the partition-wall section, the first permanent magnet is held by the first magnet holding section, and the second permanent magnet is held by the second magnet holding section.

According to this configuration, in a state in which the first permanent magnet and the second permanent magnet attract each other through the partition-wall section, the first permanent magnet and the second permanent magnet are respectively held by the first magnet holding section and the second magnet holding section. Thereby, the respective permanent magnets are prevented from coming off the magnet-insertion openings.

In a sixth aspect, according to any of the first to fifth aspects, the first movable member may be pivotally supported by a first pivotal shaft mounted on the support.

According to this configuration, the first movable member is pivotally shifted around the first pivotal shaft whereby it is possible to pivotally shift the operation member smoothly.

In a seventh aspect, according to any of the first to sixth aspects, the operation member may be configured to be shifted, from the operation reference position, in a first pivotal direction and in a second pivotal direction opposite to the first pivotal direction, and the first movable member and the first magnetic body are disposed in each of the first pivotal direction and the second pivotal direction, interposing the permanent magnet section.

According to this configuration, when the operation member is pivotally shifted in both of the first pivotal direction and the second pivotal direction, a click feeling is given by an attraction force acting between the first magnetic body and the permanent magnet section. Thereby, this click feeling is provided by the operation member.

In an eighth aspect, according to any of the first to seventh aspects, the operation device may include: a second movable member supported by the support at a location between the first movable member and the permanent magnet section, the second movable member being configured to operate in conjunction with a pivotal operation of the operation member; and a second magnetic body provided with the second movable member so as to face the permanent magnet section, wherein the operation member is retained at the operation reference position by the attraction force acting between the first magnetic body and the permanent magnet section when the operation member is at the operation reference position, and wherein the second movable member positions the second magnetic body away from the permanent magnet section against an attraction force acting between the second magnetic body and the permanent magnet section when the operation member is pivotally shifted in the first pivotal direction or the second pivotal direction, so that the operation member is pivotally shifted to a predetermined position.

According to this configuration, a first step click feeling with respect to the operation member is given by the attraction force acting between the first magnetic body and the permanent magnet section. Further, a second step click feeling with respect to the operation member is given by the attraction force acting between the second magnetic body and the permanent magnet section.

In a ninth aspect, a vehicular shifting apparatus according to the present disclosure includes an operation device according to any of first to eighth aspects, a control unit configured to transmit a signal to a vehicle-side equipment in response to receiving a signal from the operation device, a shift knob attached to an operation member of the operation device, and a position detecting unit configured to detect a plurality of positions at which the operation member is positioned.

According to this configuration, when the operation member is pivotally shifted to a predetermined position, a click feeling with respect to the operation member is given according to the position.

DESCRIPTION OF THE PREFERRED EMBODIMENTS

With reference to the drawings, explanation will be provided hereinafter for an operation device and a vehicular shifting apparatus using the operation device according to one embodiment of the present disclosure.

Figure 1:
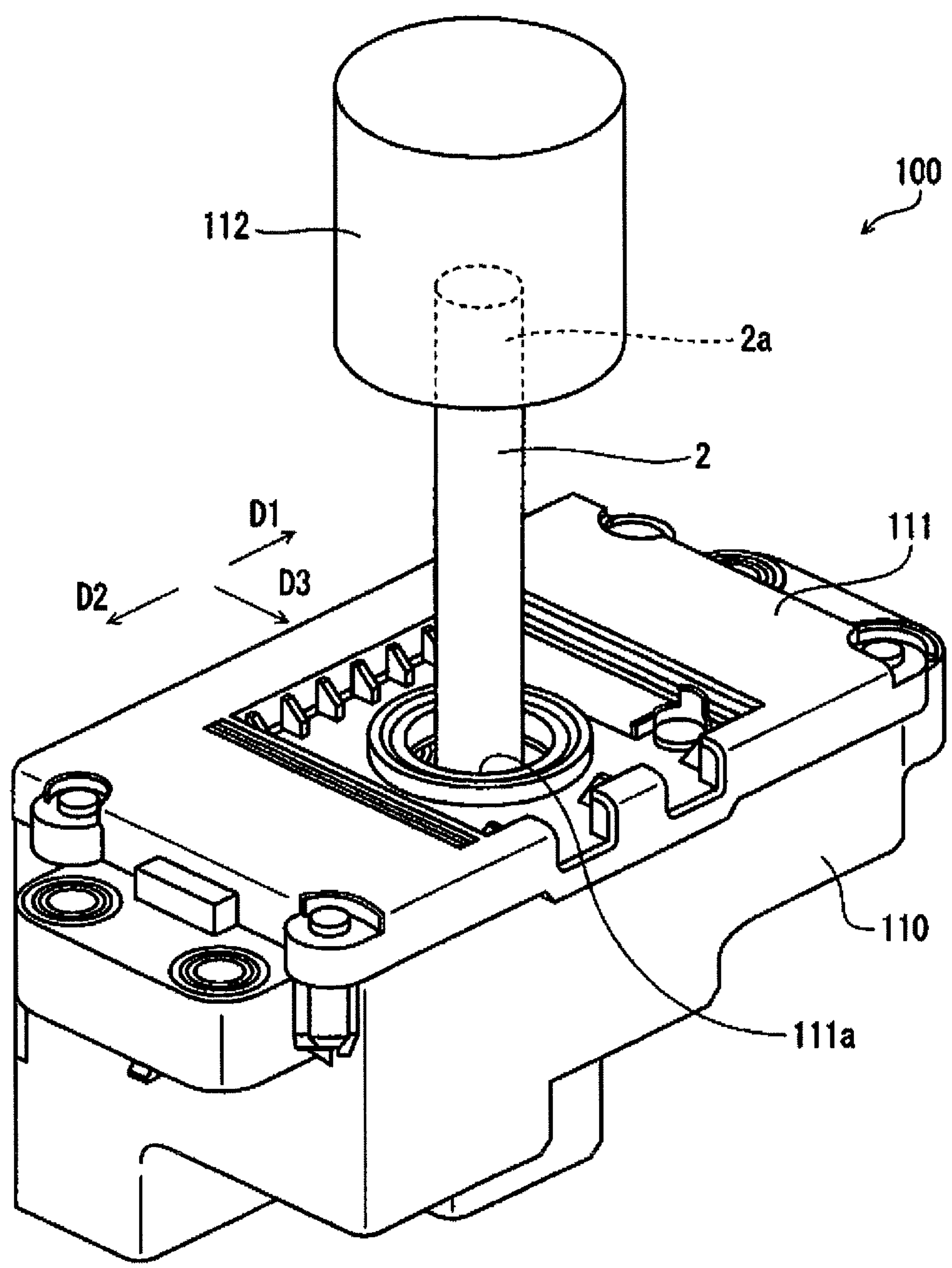
FIG. 1 is an external perspective view of a vehicular shift apparatus according to one embodiment of the present disclosure.
Figure 2:
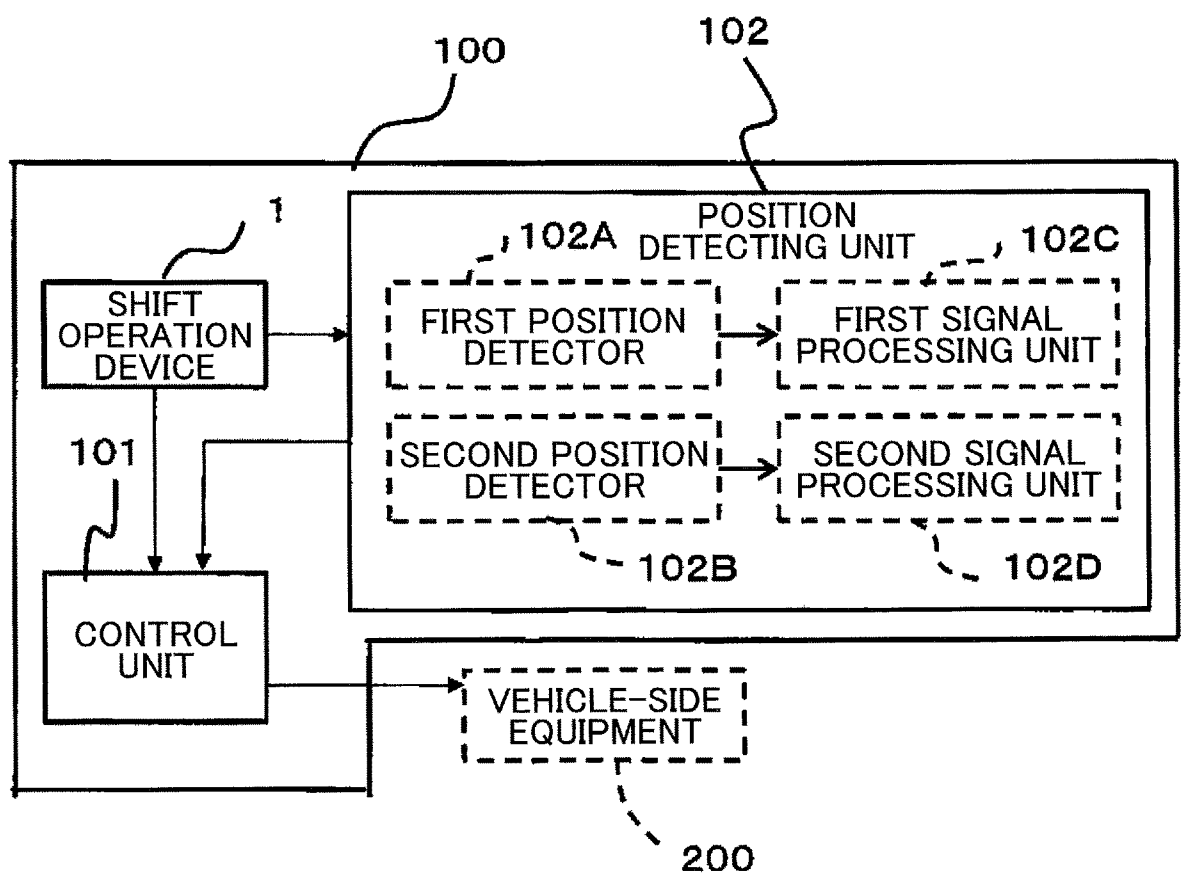
FIG. 2 is a block diagram illustrating a configuration of the vehicular shift apparatus illustrated in FIG. 1.
Figure 3:
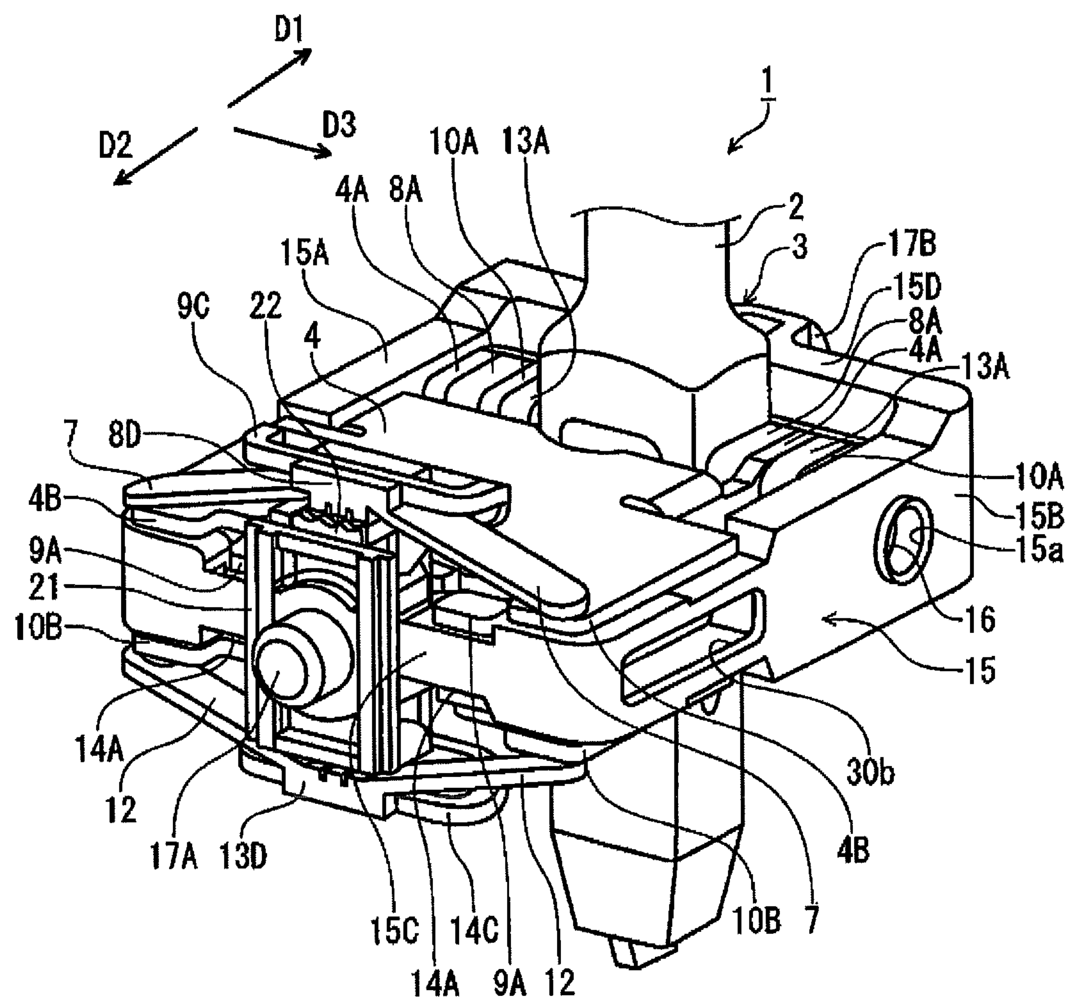
FIG. 3 is an external perspective view of a shift operation device of the vehicular shift apparatus illustrated in FIG. 1.
Figure 4:
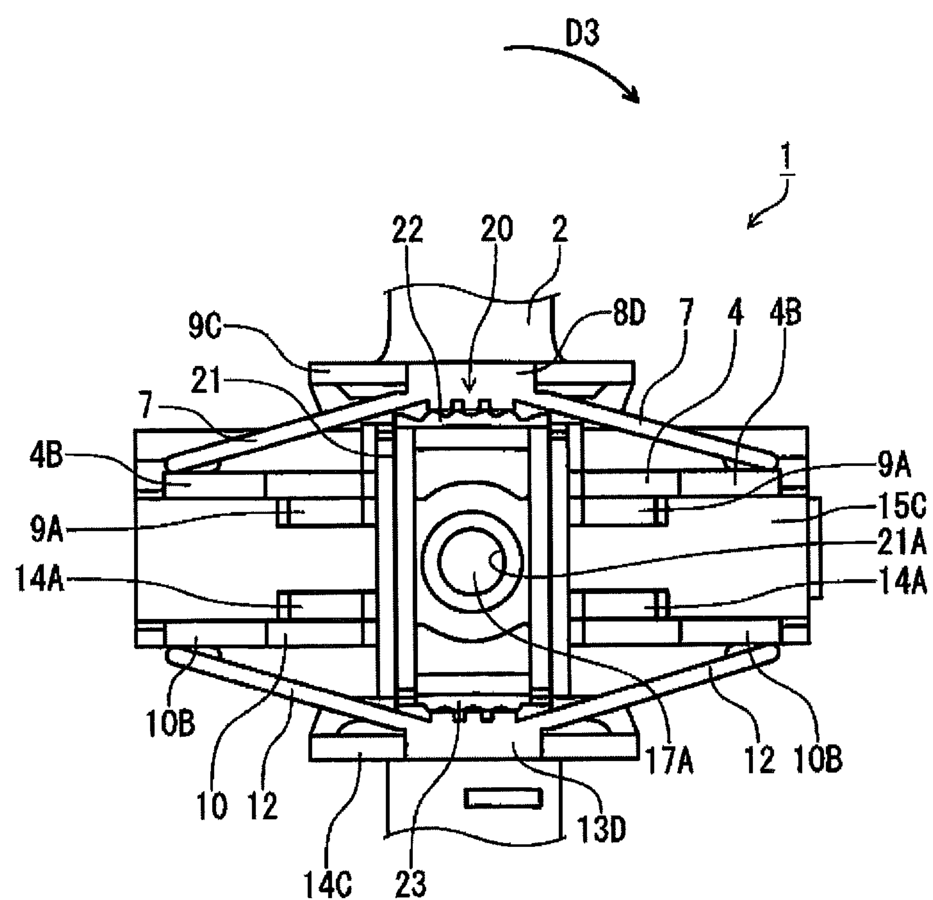
FIG. 4 is a front elevational view of the shift operation device illustrated in FIG. 3.
Figure 5:
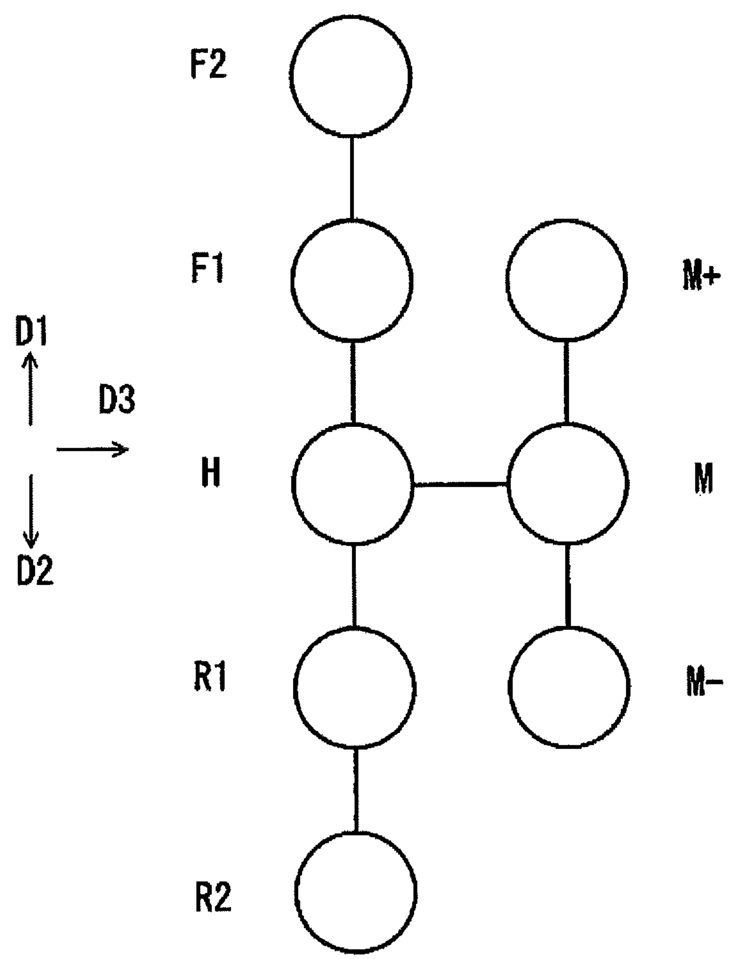
FIG. 5 is a schematic diagram for explaining each position of a shift lever of the shift operation device illustrated in FIG. 3.
Figure 6:
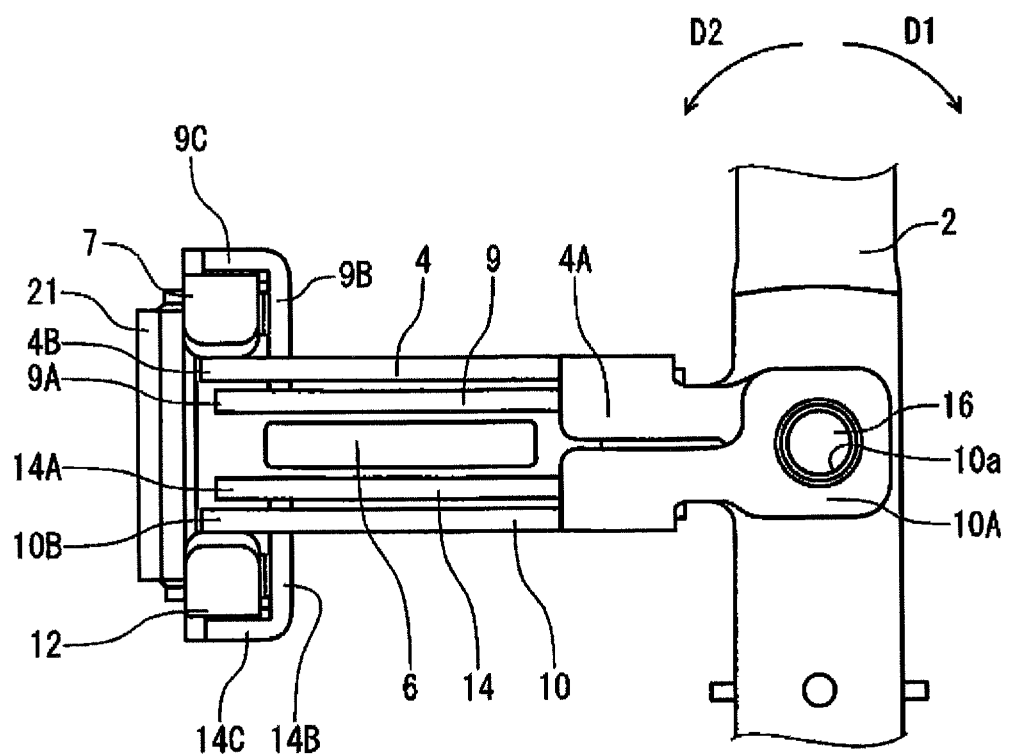
FIG. 6 is a side view of a main part of the shift operation device illustrated in FIG. 3.
Figure 7:
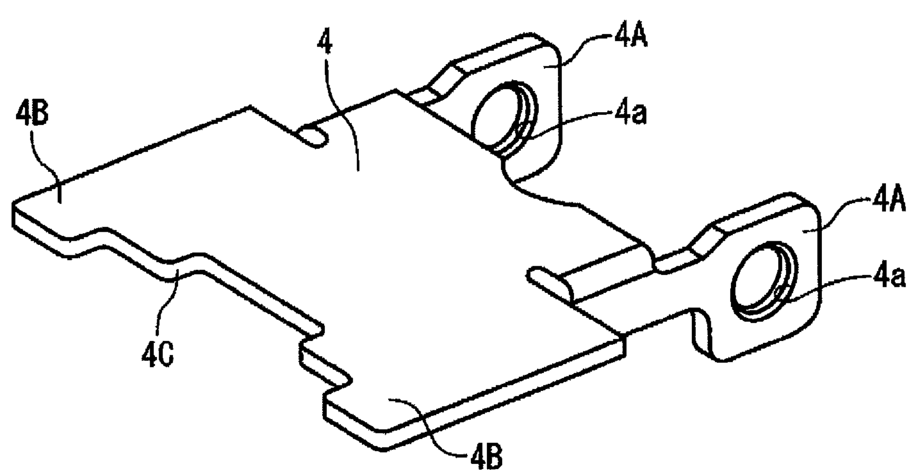
FIG. 7 is a perspective view of a first movable member (first magnetic body) of the shift operation device illustrated in FIG. 3.
Figure 8:
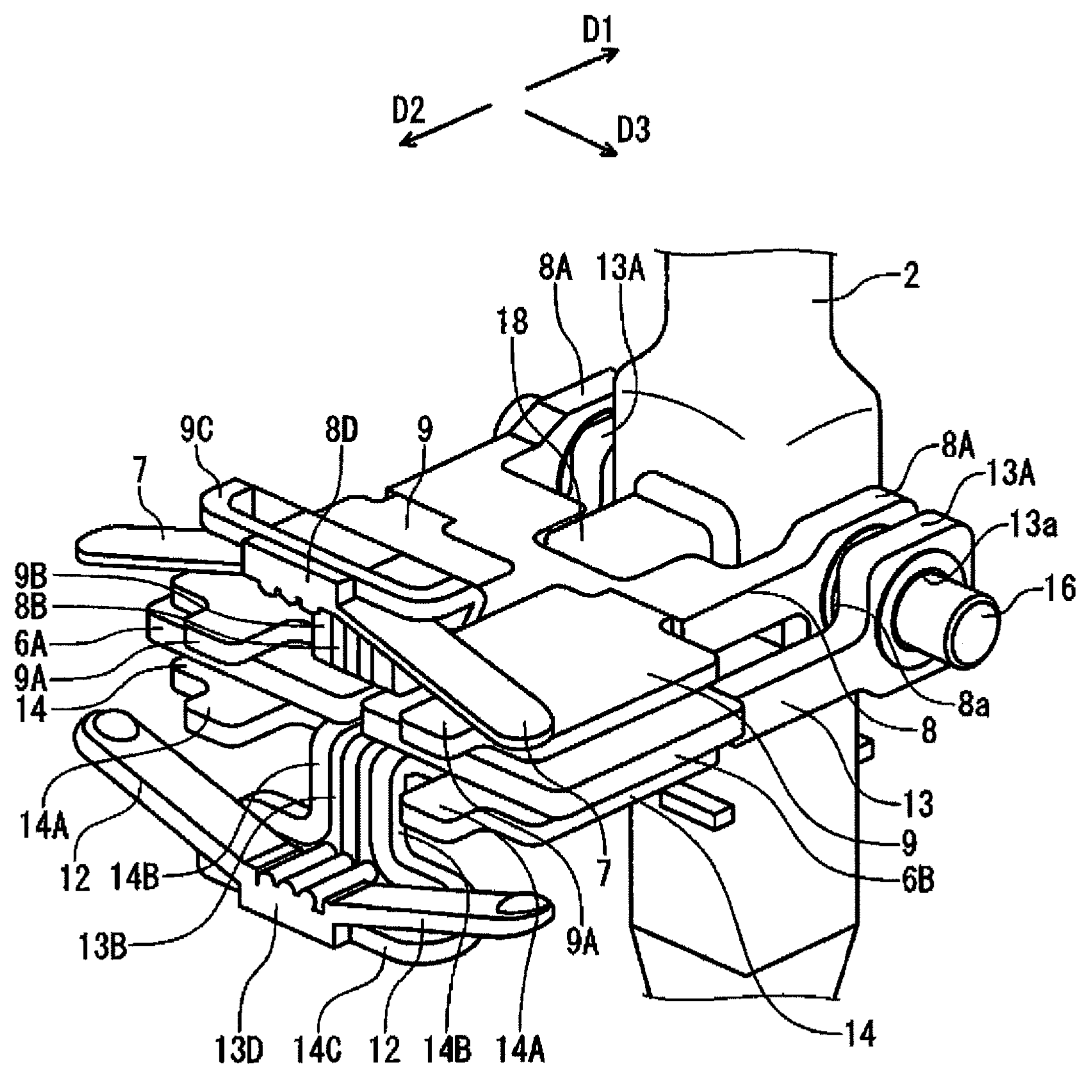
FIG. 8 is a perspective view of a second movable member and a fourth movable member of the shift operation device illustrated in FIG. 3.
Figure 9:
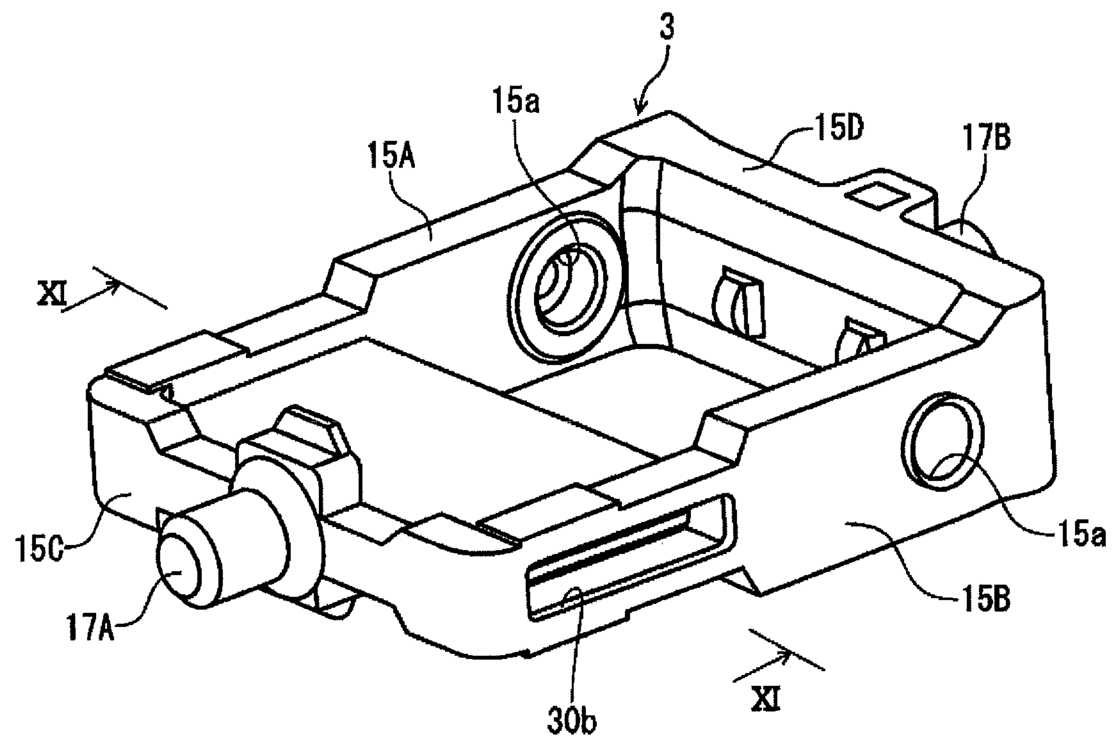
FIG. 9 is a perspective view of a frame that constitutes a support of the shift operation device illustrated in FIG. 3.
Figure 10:
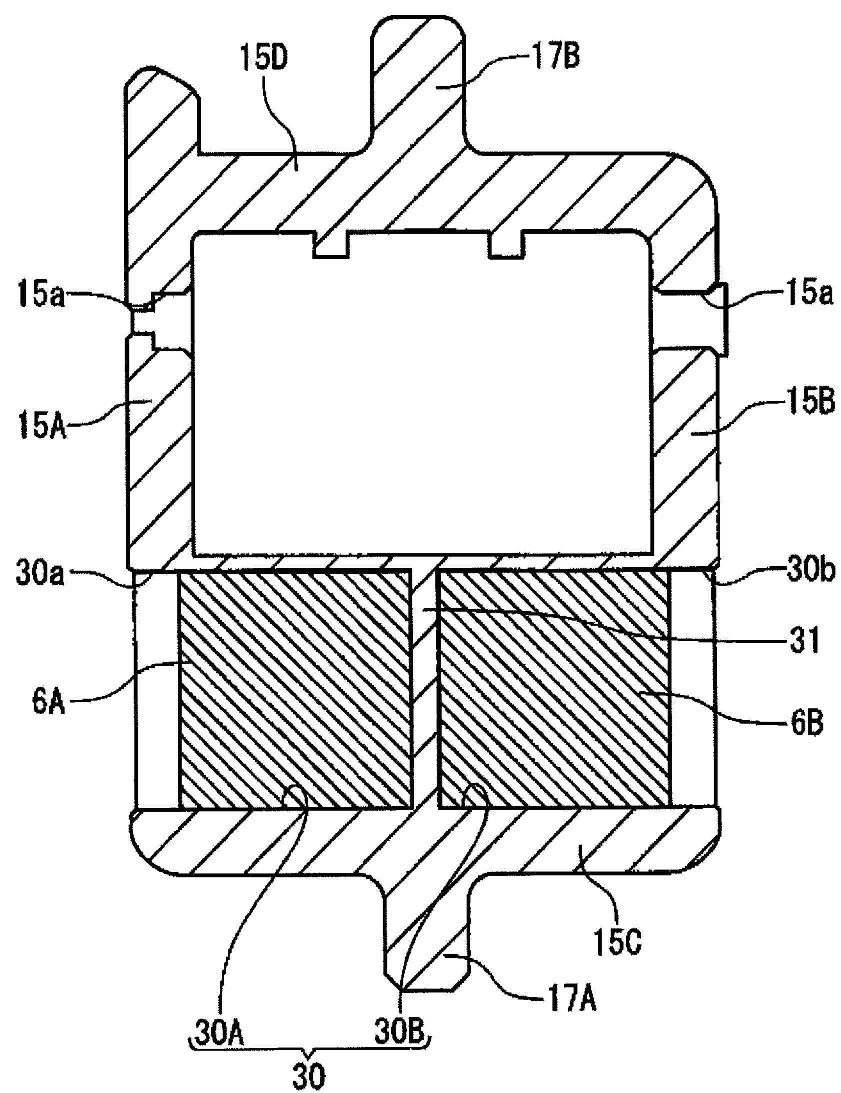
FIG. 10 is a horizontal cross section view of the frame of FIG. 9.
Figure 11:
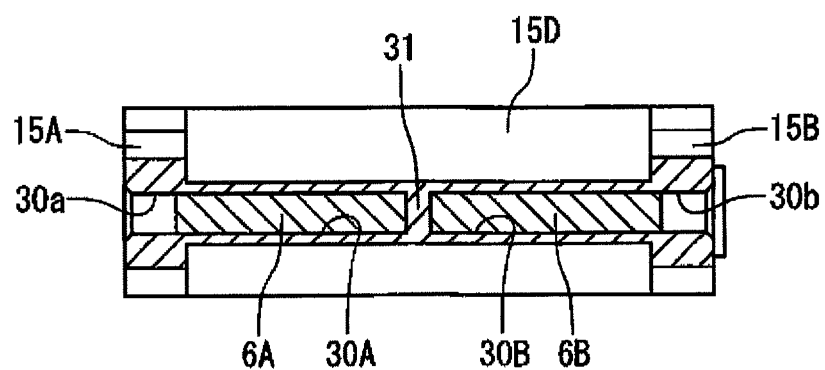
FIG. 11 is a perspective view with respect to XI-XI of FIG. 9.
Figure 12:
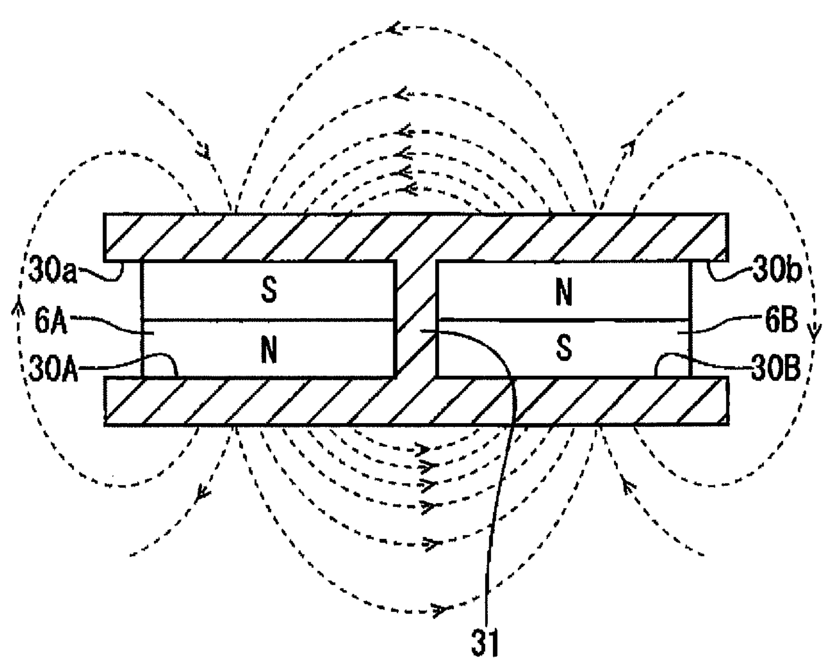
FIG. 12 is a cross sectional side view schematically illustrating an operation of the permanent magnet section illustrated in FIG. 3.
Figure 13:
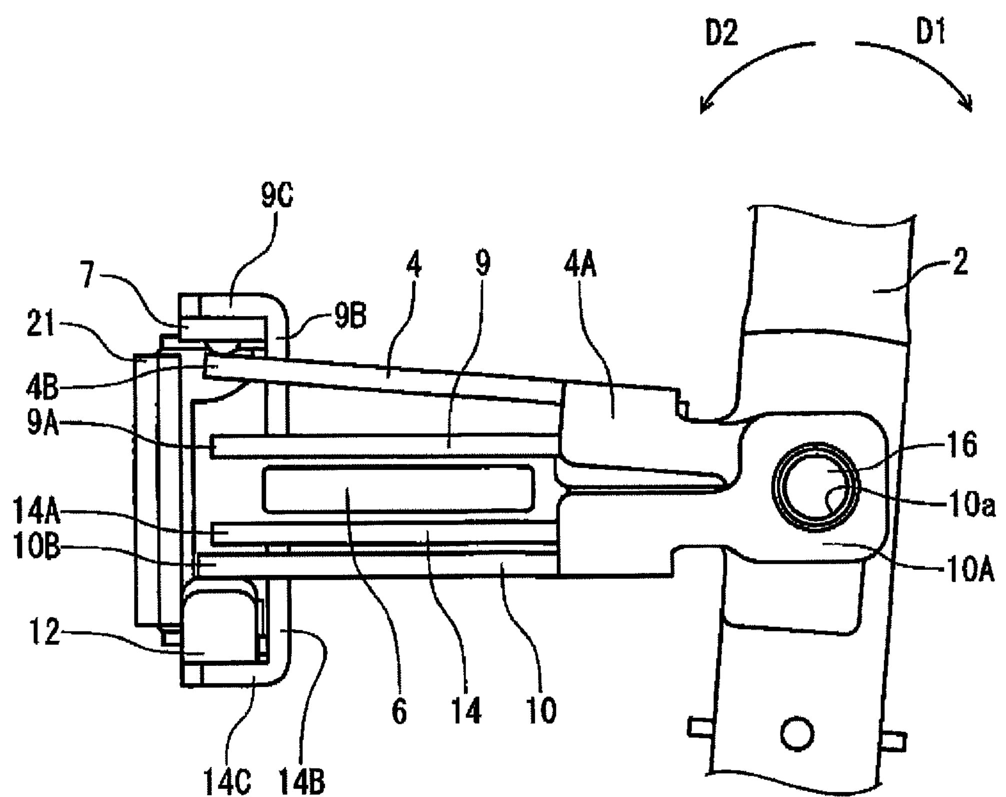
FIG. 13 is a side view of a main part of a state in which the first movable member of the shift operation device illustrated in FIG. 6 is pivotally shifted in a first pivotal direction.
Figure 14:
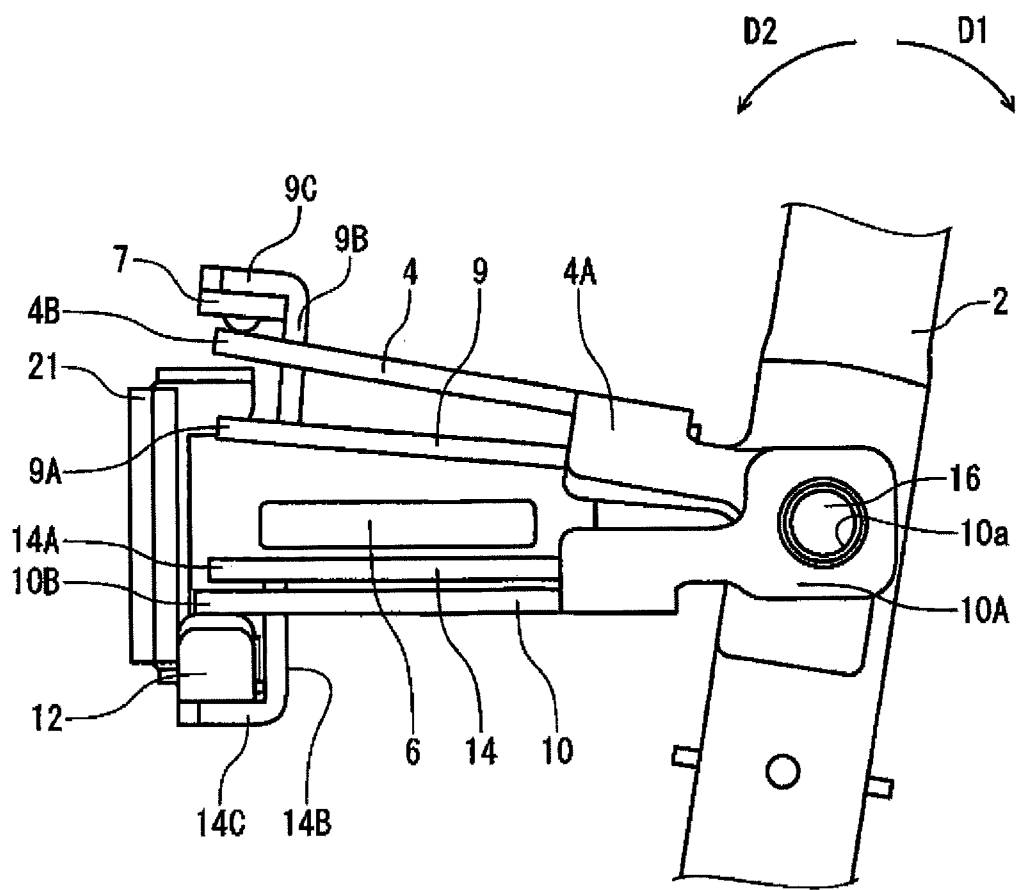
FIG. 14 is a side view of a main part of a state in which the second movable member of the shift operation device illustrated in FIG. 6 is pivotally shifted in the first pivotal direction.
Figure 15:
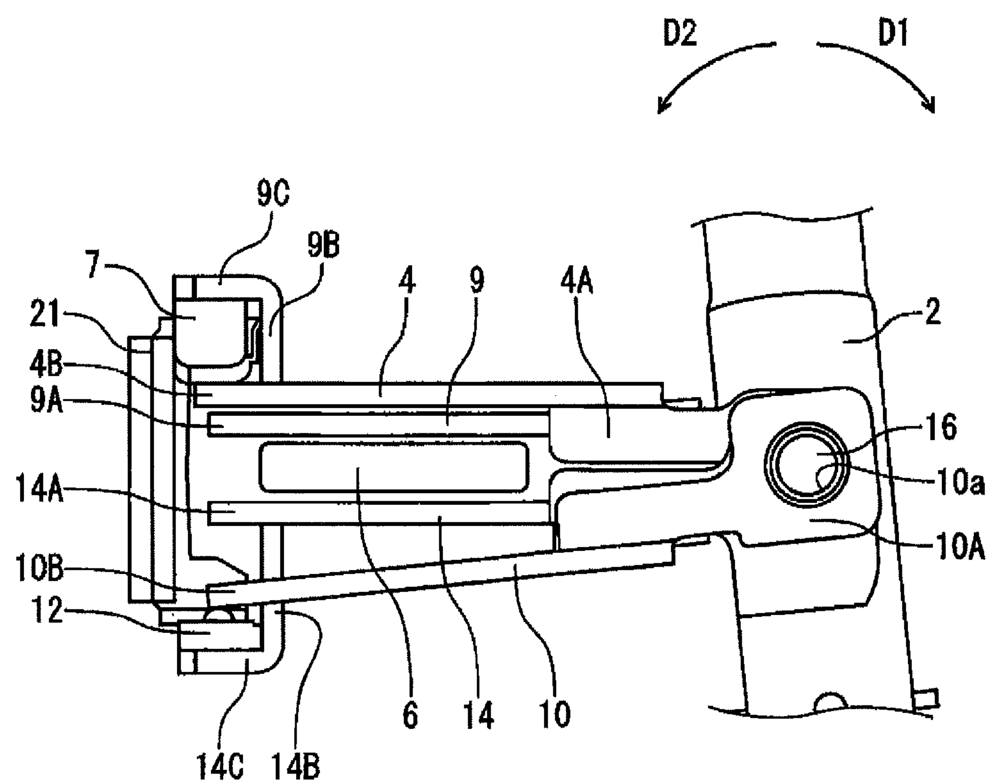
FIG. 15 is a side view of a main part of a state in which a third movable member of the shift operation device illustrated in FIG. 6 is pivotally shifted in a second pivotal direction.
Figure 16:
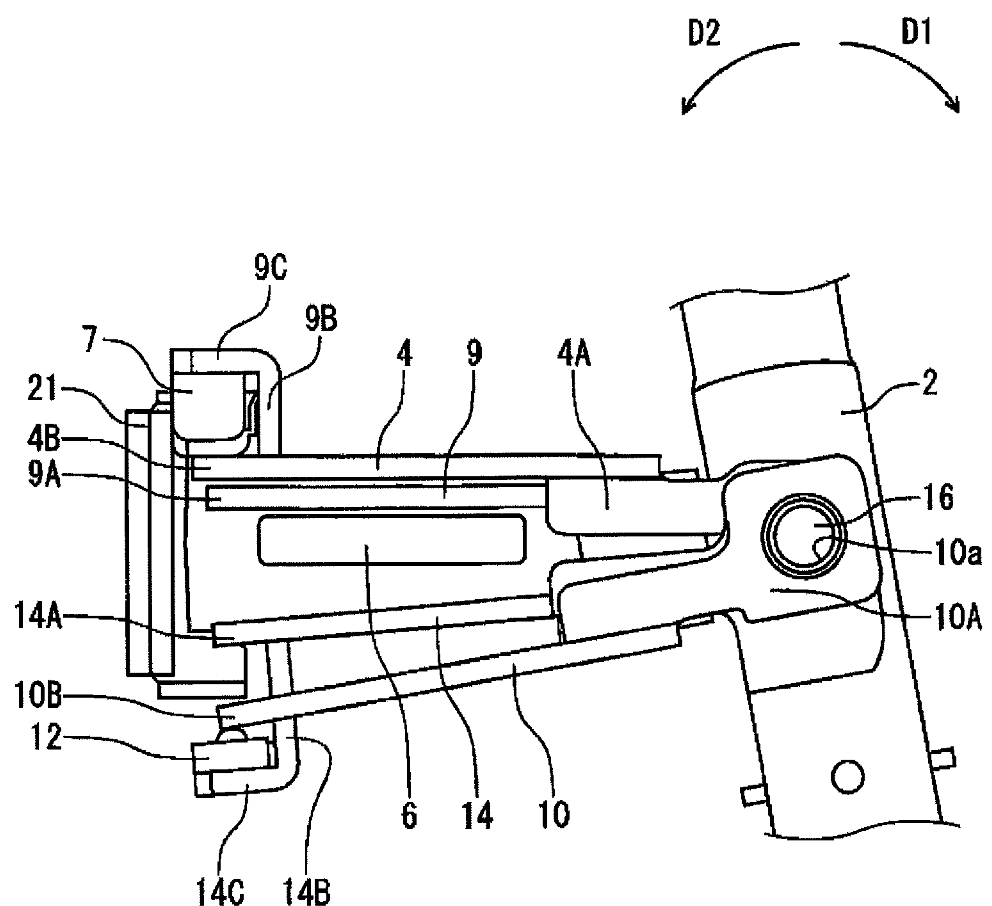
FIG. 16 is a side view of a main part of a state in which a fourth movable member of the shift operation device illustrated in FIG. 6 is pivotally shifted in the second pivotal direction.
Figure 17:
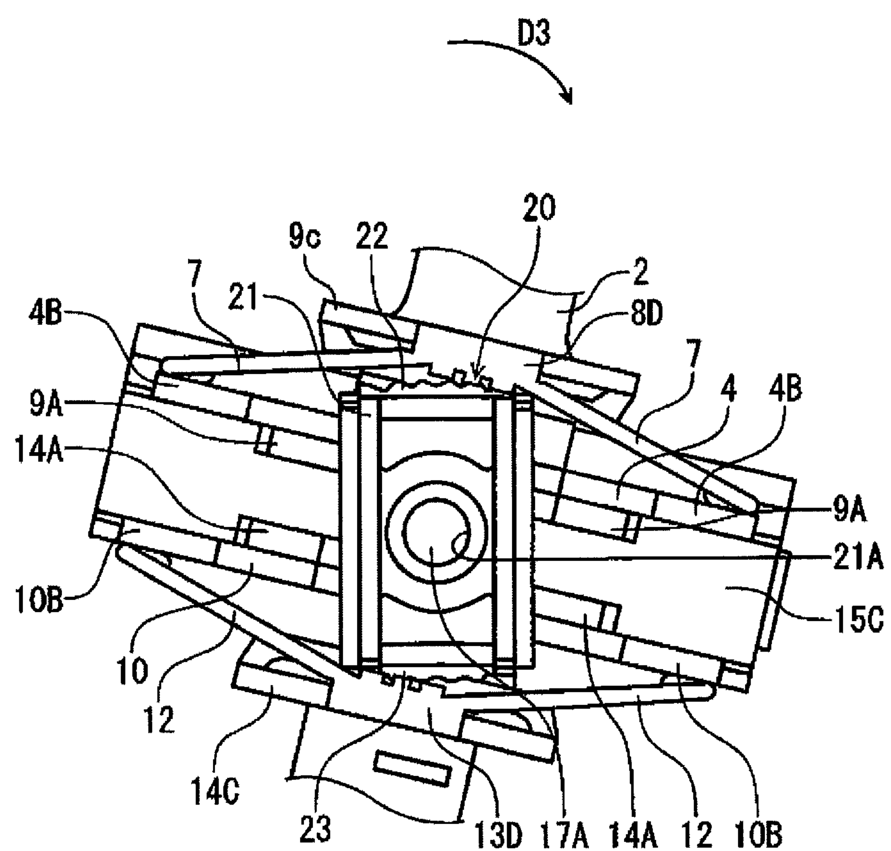
FIG. 17 is a front elevational view of a state in which an operation member of the shift operation device illustrated in FIG. 4 is pivotally shifted in a third pivotal direction.

FIG. 1 is an external perspective view of a vehicular shift apparatus according to one embodiment of the present disclosure. FIG. 2 is a block diagram illustrating a configuration of the vehicular shift apparatus illustrated in FIG. 1. FIG. 3 is an external perspective view of a shift operation device of the vehicular shift apparatus illustrated in FIG. 1. FIG. 4 is a front elevational view of the shift operation device illustrated in FIG. 3. FIG. 5 is a schematic diagram for explaining each position of a shift lever of the shift operation device illustrated in FIG. 3. FIG. 6 is a side view of a main part of the shift operation device illustrated in FIG. 3, illustrating a state where the shift lever is positioned at a home position H. FIG. 7 is a perspective view of a first movable member of the shift operation device illustrated in FIG. 3. FIG. 8 is a perspective view of a second movable member and a fourth movable member of the shift operation device illustrated in FIG. 3. FIG. 9 is a perspective view of a frame that constitutes a support of the shift operation device illustrated in FIG. 3. FIG. 10 is a horizontal cross section view of the frame of FIG. 9. FIG. 11 is a perspective view with respect to XI-XI of FIG. 9. FIG. 12 is a cross sectional side view schematically illustrating an operation of the permanent magnet section illustrated in FIG. 3. FIG. 13 is a side view of a main part of a state in which the first movable member of the shift operation device illustrated in FIG. 6 is pivotally shifted in a first pivotal direction (D1 direction), illustrating a state where the shift lever is pivotally shifted to a first step position F1. FIG. 14 is a side view of a main part of a state in which the second movable member of the shift operation device illustrated in FIG. 6 is pivotally, shifted in the first pivotal direction (D1 direction), illustrating a state where the shift lever is pivotally shifted to a second step position F2. FIG. 15 is a side view of a main part of a state in which a third movable member of the shift operation device illustrated in FIG. 6 is pivotally shifted in a second pivotal direction (D2 direction), illustrating a state where the shift lever is pivotally shifted to a first step position R1. FIG. 16 is a side view of a main part of a state in which a fourth movable member of the shift operation device illustrated in FIG. 6 is pivotally shifted in the second pivotal direction (D2 direction), illustrating a state where the shift lever is pivotally shifted to a second step position R2. FIG. 17 is a front elevational view of a state in which an operation member of the shift operation device illustrated in FIG. 4 is pivotally shifted in a third pivotal direction (D3 direction).

Note that, in the figures, an arrow for a D1 direction indicates a first pivotal direction of the shift lever, an arrow for a D2 direction indicates a second direction of the shift lever, and an arrow for a D3 indication indicates a third pivotal direction of the shift lever.

(Vehicular Shifting Apparatus)

As illustrated in FIGS. 1 to 4, a vehicular shifting apparatus 100 includes a shift operation device 1 that is an operation device, a control unit 101 that receives a signal from the shift operation device 1 to transmit a signal to a vehicle-side equipment 200, and a position detecting unit 102 that detects a plurality of positions to which a shift lever 2 used as an operation member of the shift operation device 1 is pivotally shifted.

The vehicular shifting apparatus 100 includes a case body 110 and a cover 111 for covering an opening on an upper portion of the case body 110. The case body 110 houses the shift operation device 1 that is the operation device.

The case body 110 is formed by injection molding of a resin material such as polybutylene terephthalate (PBT).

The cover 111 is formed by injection molding of resin such as polybutylene terephthalate (PBT), as with the case of the case body 110. A circle hole 111*a* is formed in a central portion of the cover 111, and a shift lever 2 that is the operation member is inserted through the hole 111*a*. A tip end 2*a* of the shift lever 2 is protruded from an upper surface of the cover 111. A shift knob 112 for pivotally shifting the shift lever 2 is mounted on the tip end 2*a* of the shift lever 2.

The shift knob 112 is formed of resin such as ABS (ABS, acrylonitrile butadiene styrene) resin.

The vehicular shifting apparatus 100 does not employ a mechanical control system in which the shift knob 112 is directly connected to a transmission, but employs a shift-by-wire system. For the vehicular shifting apparatus 100 with the shift-by-wire system, since a mechanical structure such as a link mechanism is not required, the size can be decreased. Accordingly, a layout of the vehicular shifting apparatus 100 can be flexible in a vehicle. Also, since the shift lever 2 can be operated with a relatively small force, a shift change operation can be easily performed.

The vehicular shifting apparatus 100 includes a control unit 101 coupled to the vehicle-side equipment, and the position detecting unit that detects an operation position of the shift lever 2 provided with the shift operation device.

The control unit 101 transmits a position information signal of each operation position, to which the shift lever 2 is pivotally shifted, to the vehicle-side equipment 200. In response to receiving the position information signal, the vehicle-side equipment 200 operates according to a shift pattern, and displays, on a display unit provided with an instrument panel or the like, a shift state with respect to the vehicle according to an operation position of the shift lever 2 in the shift pattern.

The position detecting unit 102 includes a first position detector 102A for detecting a plurality of positions when the shift lever 2 is pivotally shifted in a first pivotal direction (D1 direction) or a second pivotal direction (D2 direction), and includes a second position detector 102B for, when the shift lever 2 is pivotally shifted in a third pivotal direction (D3 direction), detecting its position. The first position detector 102A and the second position detector 102B are housed within the case body 110. Note that the first position detector 102A is engaged with a first pivotal shaft 16 in the support 3 described below to detect a rotation angle of the first pivotal shaft 16. Also, the second position detector 102B is engaged with shaft sections 17A and 17B that constitute a second pivotal shaft in the support described below to detect a rotation angle of a shaft section 17.

The position detecting unit 102 includes a first signal processing unit 102C and a second signal processing unit 102D that respectively process detection signals transmitted from the first position detector 102A and the second position detector 102B. The first signal processing unit 102C calculates a rotation angle of the first pivotal shaft 16 based on a signal transmitted from the first position detector 102A, and detects a movement in the first pivotal direction (D1 direction) or the second pivotal direction (D2 direction) with respect to the shift lever 2 based on the calculated rotation angle. Similarly, the second signal processing unit 102D calculates rotation angles of the shaft sections 17A and 17B based on a signal transmitted from the second position detector 102B, and detects a movement in a third pivotal direction (D3 direction) with respect to the shift lever 2 based on the calculated rotation angles.

Next, with reference to FIG. 5, explanation will be provided for a shift operation of the vehicular shifting apparatus 100.

When the shift lever 2 is pivotally shifted from a home position H (operation reference position) in the first pivotal direction (D1 direction), the shift lever 2 moves to a position F1. The position F1 is a first step position F1 in the first pivotal direction (D1 direction). When the shift lever 2 is further pivotally shifted from the first step position F1 in the first pivotal direction (D1 direction), the shift lever 2 moves to a position F2. The position F2 is a second step position F2 in the first pivotal direction (D1 direction).

When a pivotal operation of the shift lever 2 that is positioned at the first step position F1 or the second step position F2 in the first pivotal direction (D1 direction) is released, the shift lever 2 is pivotally shifted in the second pivotal direction (D2 direction) automatically, so that the shift lever 2 returns to the position H. In this case, a shift state of the vehicle is maintained at F1 or F2.

When the shift lever 2 is pivotally shifted from the home position H in the second pivotal direction (D2 direction), the shift lever 2 moves to a position R1. The position R1 is a first step position R1 in the second pivotal direction (D2 direction). When the shift lever 2 is further pivotally shifted from the first step position R1 in the second pivotal direction (D2 direction), the shift lever 2 moves to a position R2. The position R2 is a second step position R2 in the second pivotal direction (D2 direction).

When the pivotal operation of the shift lever 2 that is positioned at the first step position R1 or the second step position R2 in the second pivotal direction (D2 direction) is released, the shift lever 2 is pivoted in the first pivotal direction (D1 direction) automatically, so that the shift lever 2 returns to the position H. In this case, the shift state of the vehicle is maintained at R1 or R2.

Next, when the shift lever 2 is pivotally shifted from the home position H in the third pivotal direction (D3 direction), the shift lever 2 moves to a position M. Even in a case where the pivotal operation of the shift lever 2 that is positioned at the position M is released, the shift lever 2 is maintained in a state of being pivoted at a location of the position M. When the shift lever 2 that has been pivotally shifted to the position M is further pivotally shifted in the first pivotal direction (D1 direction), the shift lever 2 moves to M+. When the shift lever 2 that is positioned at the position M is further shifted in the second pivotal direction (D2 direction), the shift lever 2 moves to M−. When the pivotal operation of the shift lever 2 that is positioned at M+ or M− is released, the shift lever 2 is pivoted in an opposite direction of the previous pivotal operation automatically, so that the shift lever 2 returns to the position M. In this case, the shift state of the vehicle is maintained at M+ or M−.

(Shift Operation Device)

As illustrated in FIGS. 3, 4, and 6 to 8, the shift operation device 1 includes the shift lever 2, a support 3 for pivotally supporting the shift lever 2, and a first movable member 4 that is pivotally shifted from the operation reference position (home position H) in the first pivotal direction (D1 direction) in conjunction with the shift lever 2. The first movable member 4 is formed of magnetic material such as iron, and serves as a first magnetic body. Note that in the present disclosure, the first magnetic body may be mounted on the first movable member 4.

The shift operation device 1 includes a permanent magnet section 6 that is supported by the support 3 so as to face the first movable member 4 at the operation reference position. The permanent magnet section 6 includes a first permanent magnet 6A and a second permanent magnet 6B. The first permanent magnet 6A and the second permanent magnet 68 are respectively held by a first magnet holding section 30A and a second magnet holding section 30B described below, so as to be arranged in parallel in a width direction.

The shift operation device 1 includes a pair of first plate springs 7 and 7 that is a first elastic member for biasing the first movable member 4 in a direction in which the first movable member 4 moves toward the permanent magnet section 6. The shift operation device 1 also includes a second movable member 8 that is disposed between the first movable member 4 and the permanent magnet section 6 and that further is pivotally shifted in the first pivotal direction (D1 direction) in conjunction with the shift lever 2. The shift operation device 1 further includes a pair of second magnetic bodies 9 and 9 provided with the second movable member 8.

In a case where the shift lever 2 is at the operation reference position, the first movable member 4 and the second magnetic bodies 9 and 9 are close together and are disposed in the first pivotal direction (D1 direction) with respect to the permanent magnet section 6. Further, the first movable member 4 and the second magnetic bodies 9 and 9 are each attracted by the permanent magnet section 6.

Also, the shift operation device 1 includes a third movable member 10 that interposes the permanent magnet section 6 and is disposed on an opposite side of the first movable member 4 and that is pivotally shifted from the operation reference position in the second pivotal direction (D2 direction) in conjunction with the shift lever 2. The third movable member 10 is formed of magnetic material such as iron, and serves as a third magnetic body. Note that in the present disclosure, the third magnetic body may be mounted on the third movable member 10.

The shift operation device 1 includes a pair of second plate springs 12 and 12 that is a second elastic member for biasing the third movable member 10 in a direction in which the third movable member 10 moves toward the permanent magnet section 6. The shift operation device 1 also includes a fourth movable member 13 that is disposed between the third movable member 10 and the permanent magnet section 6 and that is pivotally shifted in the second pivotal direction (D2 direction) in conjunction with the shift lever 2. The shift operation device 1 includes a pair of fourth magnetic bodies 14 and 14 provided with the fourth movable member 13.

In a case where the shift lever 2 is at the operation reference position, the third movable member 10 and the fourth permanent magnet bodies 14 and 14 are close together and are disposed in the second pivotal direction (D2 direction) with respect to the permanent magnet section 6. Further, the third movable member 10 and the fourth magnetic body 14 are each attracted by the permanent magnet section 6.

Note that the third movable member 10 is a first movable member disposed in the second pivotal direction (D2) and has the same configuration as the first movable member 4 disposed in the first pivotal direction (D1). Also, the fourth movable member 13 is a second movable member disposed in the second pivotal direction (D2) and has the same configuration as the second movable member 8 disposed in the first pivotal direction (D1). The fourth magnetic bodies 14 and 14 are second magnetic bodies disposed in the second pivotal direction (D2) and have the same configuration as the second magnetic bodies 9 and 9 disposed in the first pivotal direction (D1). A configuration of the first plate springs 7 and 7 is same as that of the second plate springs 12 and 12.

(Support)

The support 3 has a rectangular frame 15 that is formed of non-magnetic material such as zinc die-cast. The frame 15 has a first frame section 15A and a second frame section 15B that are opposite to each other, as well as a third frame section 15C and a fourth frame section 15D that are opposite to each other in a direction perpendicular to the first frame section 15A and the second frame section 15B. Upper and lower surfaces of the frame 15 are open. In the first frame section 15A and the second frame section 15B, the respective shaft-receiving sections 15*a* and 15*a* are formed so as to be opposite to each other. Both end portions of a first pivotal shaft 16 that constitutes part of the support 3 rotatably fit the shaft-receiving sections 15*a* and 15*a*.

The first movable member 4 is pivotally shifted around the first pivotal shaft 16, thereby enabling a smooth pivotal operation of the shift lever 2.

A base end of the shift lever 2 is mounted together with the first pivotal shaft 16. Both ends of the first pivotal shaft 16 are rotatably supported by the shaft-receiving sections 15*a* and 15*a*, so that the shift lever 2 is pivotally shifted in the first pivotal direction (D1 direction) or the second pivotal direction (D2 direction).

In the third frame section 15C and fourth frame section 15D, a pair of shaft sections 17A and 17B that constitute part of the support 3 is coaxially formed so as to protrude outwardly. The shaft sections 17A and 17B are rotatably supported in the case body 110. A second pivotal shaft is constituted by a combination of the shaft sections 17A and 17B, and the shift lever 2 is supported so that it can be pivotally shifted in the third pivotal direction (D3 direction).

In such a configuration, the shift lever 2 is pivotally shifted in the first pivotal direction (D1 direction), the second pivotal direction (D2 direction) and the third pivotal direction (D3 direction).

(First Movable Member (First Magnetic Body))

As illustrated in FIG. 7, the first movable member 4 is formed of magnetic material such as iron to have a plate shape. The first movable member 4 serves as a first magnetic body. On base end sides of both end portions of the first movable member 4, a pair of bent mounting portions 4A and 4A is formed. In the mounting portions 4A and 4A, shaft-receiving sections 4*a* and 4*a* are formed so as to be opposite to each other. Both ends of the first pivotal shaft 16 rotatably fit the shaft-receiving sections 4*a* and 4*a*, and the first movable member 4 is rotatably supported around the first pivotal shaft 16 in the frame 15.

In both end portions of the first movable member 4, plate spring-receiving sections 4B and 4B that respectively contact front ends of first plate springs 7 and 7 are formed so as to extend horizontally.

A back surface of the base end of the first movable member 4 is received by a supporting-block section 18 protruding integrated with the base end of the shift lever 2, so that the shift lever 2 is supported at the operation reference position so as not to be pivoted in the first pivotal direction (D1 direction). Note that when the first movable member 4 is at the operation reference position, the shift lever 2 is supported by an attraction force between the first movable member 4 and the permanent magnet section 6 as well.

(Third Movable Member (Third Magnetic Body))

The third movable member 10 is formed of magnetic material such as iron to have a plate shape. The third movable member 10 serves as a third magnetic body. On base end sides of both end portions of the third movable member 10, a pair of bent mounting portions 10A and 10A is formed. In the mounting portions 10A and 10A, shaft-receiving sections 10*a* and 10*a* are formed so as to be opposite to each other. Both ends of the first pivotal shaft 16 fit the shaft-receiving sections 10*a* and 10*a*, and the third movable member 10 is rotatably supported around the first pivotal shaft 16 in the frame 15.

On both end portions of the third movable member 10, plate spring-receiving sections 10B and 10B that respectively contact second plate springs 12 and 12 are formed so as to extend horizontally.

A back surface of the base end of the third movable member 10 is received by the supporting-block section 18 protruding integrated with the base end of the shift lever 2, so that the shift lever 2 is supported at the operation reference position so as not to be pivoted in the second pivotal direction (D2 direction). Note that when the third movable member 10 is at the operation reference position, the shift lever 2 is supported by an attraction force between the third magnet body 11 and the permanent magnet section 6 as well.

(Second Movable Member (Second Magnetic Body))

The second movable member 8 is formed of resin to have a plate shape. On base end sides of both end portions of the second movable member 8, a pair of mounting portions 8A and 8A is formed so as to be opposite to each other. In the mounting portions 8A and 8A, shaft-receiving sections 8*a* and 8*a* are formed so as to be opposite to each other. The shaft-receiving sections 8*a* and 8*a* fit both ends of the first pivotal shaft 16, as with the case of the first movable member 4. The second movable member 8 is rotatably supported around the first pivotal shaft 16 in the frame 15.

As described above, the first movable member 4 and the second movable member 8 are pivotally shifted around the first pivotal shaft 16, thereby enabling a smooth pivotal operation of the shift lever 2. Also, the first pivotal shaft 16 is a common pivotal shaft to the first movable member 4 and the second movable member 8, thereby decreasing the number of components and improving the usability of a storage space in the case body 110, as well as decreasing the size.

On front end sides of the second movable member 8, a pair of second magnetic bodies 9 and 9 that is formed of magnetic material such as iron to have a plate shape is arranged in parallel so as to be spaced-apart. The second magnetic bodies 9 and 9 are integrally formed with the second movable member 8.

At front ends of the second magnetic bodies 9 and 9, stopper portions 9A and 9A formed are protruded forwardly. When the stopper portions 9A and 9A contact an upper surface of the third frame section 15C, the second movable member 8 is supported at the operation reference position. Note that when the second movable member 8 is at the operation reference position, the shift lever 2 is also supported by an attraction force between the second magnet bodies 9 and 9 and the permanent magnet section 6, through the first plate springs 7 and 7 and the first movable member 4.

On front end sides of the second magnetic bodies 9 and 9, leg portions 9B and 9B are formed upright so as to be opposite to each other. Front ends of the leg portions 9B and 9B are joined by a ring-shaped and horizontally long mounting frame section 9C that is protruded forward.

On a front end side of the second movable member 8, a spring-supporting-leg section 8B is integrally formed so as to be sandwiched between the leg portions 9B and 9B. A front end of the spring-supporting-leg section 8B is integrally formed with the mounting frame section 9C. At a front end of the spring-supporting-leg section 8B, first plate springs 7 and 7 are formed integrally so as to extend in directions of both sides of the second movable member 8. Front ends of the first plate springs 7 and 7 are formed downwardly so as to be on a surface of the second movable member 8.

The second movable member 8 is inserted into a notch section 4*c* in which the mounting frame section 9C is formed on a front end side of the first movable member 4. The front ends of the first plate springs 7 and 7 contact plate spring-receiving sections 4B and 4B, and are received by the plate spring-receiving sections 4B and 4B.

(Fourth Movable Member and Fourth Magnetic Body)

The fourth movable member 13 is formed of resin to have a plate shape. On base end sides of both end portions of the fourth movable member 13, a pair of mounting portions 13A and 13A is formed so as to be opposite to each other. In the mounting portions 13A and 13A, shaft-receiving sections 13*a* and 13*a* are formed. As in the case of the first movable member 8, the shaft-receiving sections 13*a* and 13*a* fit the first pivotal shaft 16, and the fourth movable member 4 is rotatably supported around the first pivotal shaft 16 in the frame 15.

On a front end side of the fourth movable member 13, a pair of fourth magnetic bodies 14 and 14 is arranged in parallel so as to be spaced-apart. At front ends of the fourth magnetic bodies 14 and 14, a pair of stopper portions 14A and 14A are formed to extend horizontally. The stopper portions 14A and 14A contact a lower surface of the third frame section 15C, so that the fourth movable member 13 is supported at the operation reference position.

Note that when the fourth movable member 13 is at the operation reference position, the shift lever 2 is also supported by an attraction force between the fourth magnet body 14 and the permanent magnet section 6, through the second plate springs 12 and 12 and the third movable member 10.

Front ends of leg portions 14B and 14B that are formed on front end sides of the fourth magnetic bodies 14 and 14 are joined by a horizontal ring-shaped mounting-frame section 14C.

On the front end side of the fourth movable member 13, a spring-supporting leg section 13B is integrally formed so as to be sandwiched between the leg portions 14B and 14B. A front end of the spring-supporting leg section 13B is integrally formed with a mounting-frame section 14C.

At the front end of the spring-supporting leg section 13B, the second plate springs 12 and 12 are integrally formed so as to extend in the respective directions of both ends of the fourth movable member 13. The front ends of the respective second plate springs 12 and 12 are formed so as to hang down from a surface of the fourth movable member 13.

The front ends of the respective second plate springs 12 and 12 contact the plate-spring-receiving sections 10B and 10B of the third movable member 10, and are received by the plate spring-receiving sections 10B and 10B.

An intermittent-driving mechanism 20 for pivotally shifting the shift lever 2 in the third pivotal direction (D3 direction) intermittently is disposed between the third frame section 15C in the frame 15 and the case body 110.

The intermittent-driving mechanism 20 includes a shaft-receiving plate 21 mounted together on the case body 110, and a first cam section 8D integrally formed with the spring-supporting leg section 8B at the front end of the spring-supporting leg section 8B in the second movable member 8. Also, a second cam section 13D is formed at the front end of the spring-supporting leg section 13B in the fourth movable member 13.

In an upper end portion of the shaft-receiving plate 21, a first cam-guiding section 22 that fits the first cam section 8D is formed. Also, in a lower end portion of the shaft-receiving plate 21, a second cam-guiding section 23 that fits the second cam section 13D is formed.

The first cam section 8D is pressed to the first cam-guiding section 22 by the attraction force between the second magnetic bodies 9 and 9 and the permanent magnet section 6. Also, the second cam section 13D is pressed to the second cam-guiding member 23 by the attraction force between the fourth magnetic bodies 14 and 14 and the permanent magnet section 6.

In the central portion of the shaft-receiving plate 21, a shaft-receiving section 21A that fits the shaft section 17A, which constitutes part of the second pivotal shaft protruded from the third frame section 15C, is formed.

(Permanent Magnet Section)

As illustrated in FIGS. 9 to 12, the permanent magnet section 6 includes the first permanent magnet 6A, which has a plate shape formed of neodymium, a samarium-cobalt magnet or the like, and includes the second permanent magnet 6B, which has a plate shape formed of neodymium, a samarium-cobalt magnet or the like. The first permanent magnet 6A and the second permanent magnet 6B are held by a magnet holding section 30 that is disposed between the first frame 15A and the second frame 15B in the frame 15. With respect to the magnet holding section 30, a first magnet holding section 30A for holding the first permanent magnet 6A, and a second magnet holding section 30B for holding the second permanent magnet 6B are separated by a partition-wall section 31. The first permanent magnet 6A and the second permanent magnet 6B are respectively held by the first magnet holding section 30A and the second magnet holding section 30B, and are arranged so as to be parallel to each other in a width direction. The first permanent magnet 6A and the second permanent magnet 6B are both arranged in such a manner that is between the second magnet bodies 9 and 9 and the fourth magnet bodies 14 and 14.

Individual permanent magnets common to the first permanent magnet 6A and the second permanent magnet 6B each have an N pole and an S pole created by magnetization in a series arrangement in a thickness direction pointing to the first movable member 4 (first magnet body). The second permanent magnet 6B is held by the second magnet holding section 30B such that the N pole and the S pole are situated in a reversed order of the N pole and the S pole in the first permanent magnet 6A.

In such a manner, the permanent magnet section 6 is magnetized such that in the thickness direction pointing to the first movable member 4 (first magnet body), an N pole and an S pole are created by magnetization in a series arrangement, and such that in a width direction intersecting the thickness direction pointing to the first movable member 4 (first magnet body), an S pole is created by magnetization alongside the N pole and an N pole is created by magnetization alongside the S pole created by magnetization in the thickness direction.

Each of the first permanent magnet 6A and the second permanent magnet 6B is an individual permanent magnet, thereby being magnetized as a permanent magnet by a magnetization coil. Thus, a magnetization method can be easily performed.

Also, individual permanent magnets common to the first permanent magnet 6A and the second permanent magnet 6B are used, thereby reducing the cost of components.

In the first frame 15A of the frame 15, a first magnet-insertion opening 30*a* for inserting the first permanent magnet 6A into the first magnet holding section 30A is formed. In the second frame 15B of the frame 15, a second magnet insertion opening 30*b* for inserting the second permanent magnet 6B into the second magnet holding section 30B is formed.

As illustrated in FIG. 12, in the width direction intersecting the thickness direction, the first permanent magnet 6A held by the first magnet holding section 30A and the second permanent magnet 6B held by the second magnet holding section 30B attract each other through the partition-wall section 31. Further, the first permanent magnet 6A and the second permanent magnet 6B are pressed to the partition-wall section 31, and are respectively held by the first magnet holding section 30A and the second magnet holding section 30B.

The first movable member 4 formed of magnetic material, the second magnet bodies 9 and 9, the first permanent magnet 6A and the second permanent magnet 6B, the third movable member 10 formed of magnetic material, and the fourth permanent magnet bodies 14 and 14 are arranged in a stack. Further, one side of each of the first movable member 4 and the third movable member 4 is fitted to the first pivotal shaft 16 formed of magnetic material. Thereby, a path of magnetic flux, in which magnetic flux generated by the first permanent magnet 6A and the second permanent magnet 6B returns to the first permanent magnet 6A and the second permanent magnet 6B through the first movable member 4, the first pivotal shaft 16 and the third movable member 10, is formed. Further, a path, in which magnetic flux generated by the first permanent magnet 6A passes through the fourth permanent magnet bodies 14 and 14 and the second permanent magnet 6B as well as through the second magnet bodies 9 and 9 and then returns to the first permanent magnet 6A, is formed.

The first permanent magnet 6A and the second permanent magnet 6B are respectively held by the first magnet holding section 30A and the second magnet holding section 30B, so as to be close together. Thereby, the magnetic flux, as illustrated in dash lines in FIG. 12, is generated between the first permanent magnet 6A and the second permanent magnet 6B. In a middle portion in proximity to the first permanent magnet 6A and the second permanent magnet 6B, density of magnetic flux is increased.

Accordingly, even when the first movable member 4 faces the first permanent magnet 6A and the second permanent magnet 6B, interposing the second magnetic bodies 9 and 9, the magnetic flux efficiently impacts the first movable member 4. Thereby, an attraction force with respect to the first permanent magnet 6A and the second permanent magnet 6B with either of the first movable member 4 or the second magnetic bodies 9 and 9 is increased.

Also, even when the third movable member 10 faces the first permanent magnet 6A and the second permanent magnet 6B, interposing the fourth magnetic bodies 14 and 14, magnetic flux efficiently impacts the third movable member 10. Thereby, an attraction force with respect to the first permanent magnet 6A and the second permanent magnet 6B with either of the third movable member 10 or the fourth magnetic bodies 14 and 14 is increased.

Also, the first permanent magnet 6A and the second permanent magnet 6B attract each other, and are pressed to the partition-wall section 31. The first permanent magnet 6A and the second permanent magnet 6B are respectively held by the first magnet holding section 30A and the second magnet holding section 30B. Thereby, without using a special retaining means, the first permanent magnet 6A can be prevented from coming off the first magnet-insertion opening 30*a* of the first permanent magnet 6A. Also, the second permanent magnet 6B can be prevented from coming off the second magnet-insertion opening 30*b* of the second permanent magnet 6B. Further, the first permanent magnet 6A and the second permanent magnet 6B can be easily assembled.

(Action of Shift Operation Device)

Next, with reference to FIGS. 6 and 13 to 16, explanation will be provided for a case where the shift lever 2 of the shift operation device 1 is pivotally shifted in the first pivotal direction (D1 direction) and the second pivotal direction (D2 direction).

First, the pivotal operation of the shift lever 2 in the first pivotal direction (D1 direction) is described.

FIG. 6 illustrates a state in which the shift lever 2 is retained at the operation reference position (home position H). The shift lever 2 is pivotally shifted from the state illustrated in FIG. 6 in the first pivotal direction (D1 direction). In this case, the shift lever 2 rotates about the first pivotal shaft 16 in a clockwise direction in FIG. 13. With the rotation of the shift lever 2, the supporting-block section 18 pushes up the first movable member 4 against the attraction force between the first movable member 4 and the permanent magnet section 6 as well as the biasing force of the first plate springs 7 and 7. The first movable member 4 is pushed up, and a click feeling is thus given by a force of moving the first movable member 4 away from the permanent magnet section 6. Thereby, the shift lever 2 is pivotally shifted to the first step position F1 with the click feeling.

Note that when the shift lever 2 is pivotally shifted to the first step position F1, an attraction force between the first movable member 4 and the permanent magnet section 6 is decreased, so that a powerful attraction state is shifted to a state of decreasing the attraction. Thereby, an operation load on the shift lever 2 is decreased sharply. However, the decreased operation load can be compensated by the biasing force of the first plate springs 7 and 7. Accordingly, the shift lever 2 is pivotally shifted with a load causing a good feeling of operation. Also, when the shift lever 2 is pivotally shifted to the first step position F1, the operation load on the shift lever 2 does not change sharply, thereby reducing an impact noise generated in pivotally shifting the shift lever 2.

When the pivotal operation of the shift lever 2 is released, the shift lever 2 is pivotally shifted in the second pivotal direction (D2 direction) automatically, so that the shift lever 2 returns from the first step position F1 to the home position H. In other words, the first movable member 4 is pivoted in the second pivotal direction (D2 direction) by the attraction force between the first movable member 4 and the permanent magnet section 6 as well as the biasing force of the first plate springs 7 and 7. In such a manner, the supporting-block section 18 is pushed down by the first movable member 4, and thus the shift lever 2 rotates about the first pivotal shaft 16 in an anticlockwise direction in FIG. 13. Thereby, the shift lever 2 is pivotally shifted to the home position H.

Next, in order to pivotally shift the shift lever 2 from the first step position F1 to the second step position F2 in the first pivotal direction (D1 direction), the shift lever 2 is further pivotally shifted in the first pivotal direction (D1 direction). Such a pivotal operation in the first pivotal direction (D1 direction) with respect to the shift lever 2 causes the shift lever 2 to rotate about the first pivotal shaft 16 in a clockwise direction in FIG. 14. With the rotation of the shift lever 2, the first movable member 4 rotates about the first pivotal shaft 16 in the clockwise direction in FIG. 14, so that the first plate spring-receiving sections 4B and 4B in the first movable member 4 push up the mounting-frame section 9C for the second magnetic bodies 9 and 9 via the first plate springs 7 and 7, against the attraction force between the second magnetic bodies 9 and 9 and the permanent magnet section 6. When the mounting-frame section 9C is pushed up, the second movable member 8 integrally formed with the mounting-frame section 9C is pushed up. The second movable member 8 is pushed up, thereby giving a click feeling by a force of moving the second movable member away from the permanent magnet section 6. In such a manner, the shift lever 2 is pivotally shifted to the second step position F2 with the click feeling.

Note that, in a case where the pivotal operation of the second step position F2 with respect to the shift lever 2 is released, the shift lever 2 returns to the home position H from a state of the first step position F1. In this case, the shift lever 2 is pivotally shifted in the second pivotal direction (D2 direction) automatically. In other words, the second magnetic bodies 9 and 9 are attracted by the permanent magnet section 6, and the second movable member 8 is pivoted in the second pivotal direction (D2 direction) accordingly. Further, the first movable member 4 is pivoted by the attraction force with respect to the permanent magnet section 6 as well as the biasing force of the first plate springs 7 and 7, so that the shift lever 2 returns to the home position H.

Hereafter, the pivotal operation in the second pivotal direction (D2 direction) with respect to the shift lever 2 is described.

The shift lever 2 is pivotally shifted from the state of FIG. 6 in the second pivotal direction (D2 direction). In such a manner, the shift lever 2 rotates about the first pivotal shaft 16 in an anticlockwise direction in FIG. 15. With the rotation of the shift lever 2, the supporting-block section 18 pushes up the third movable member 10 against the attraction force between the third movable member 10 and the permanent magnet section 6 as well as the biasing force of the second plate springs 12 and 12. The third movable member 10 is pushed up. The third movable member 10 is pushed up, thereby giving a click feeling by a force of moving the third movable member 10 away from the permanent magnet section 6. In such a manner, the shift lever 2 is pivotally shifted to the first step position R1 with the click feeling.

Note that when the shift lever 2 is pivotally shifted to the first step position R1, the attraction force between the third movable member 10 and the permanent magnet section 6 is decreased, so that a powerful attraction state is shifted to a state of decreasing the attraction. Thereby, an operation load on the shift lever 2 is decreased sharply. However, the decreased operation load can be compensated by the biasing force of the second plate springs 12 and 12. Accordingly, the shift lever 2 is pivotally shifted with a load causing a good feeling of operation. Also, when the shift lever 2 is pivotally shifted to the first step position R1, the operation load on the shift lever 2 does not change sharply, thereby reducing an impact noise generated in pivotally shifting the shift lever 2.

When the pivotal operation of the shift lever 2 is released, the shift lever 2 is pivotally shifted in the first pivotal direction (D1 direction) automatically, so that the shift lever 2 returns from the first step position R1 to the home position H. In other words, the third movable member 10 is pivoted in the first pivotal direction (D1 direction), by the attraction force between the third movable member 10 and the permanent magnet section 6 as well as the biasing force of the second plate springs 12 and 12. In such a manner, the supporting-block section 18 is pushed down by the third movable member 10, and thus the shift lever 2 rotates about the first pivotal shaft 16 in a clockwise direction in FIG. 15. Thereby, the shift lever 2 is pivotally shifted to the home position H.

Next, in order to pivotally shift the shift lever 2 from the first step position R1 to the second step position R2 in the second pivotal direction (D2 direction), the shift lever 2 is further pivotally shifted in the second pivotal direction (D2 direction). Such a pivotal operation in the second pivotal direction (D2 direction) with respect to the shift lever 2 causes the shift lever 2 to rotate about the first pivotal shaft 16 in an anticlockwise direction in FIG. 16. With the rotation of the shift lever 2, the third movable member 10 rotates about the first pivotal shaft 16 in the anticlockwise direction in FIG. 16, so that the plate spring-receiving sections 10B and 10B in the third movable member 10 push up the mounting-frame section 14C for the fourth magnetic bodies 14 and 14 via the second plate springs 12 and 12, against the attraction force between the fourth magnetic bodies 14 and 14 and the permanent magnet section 6. When the mounting-frame section 14C is pushed up, the fourth movable member 13 integrally formed with the mounting-frame section 14C is pushed up. The fourth movable member 13 is pushed up, thereby giving a click feeling by a force of moving the fourth movable member 13 away from the permanent magnet section 6. In such a manner, the shift lever 2 is pivotally shifted to the second step position R2 with the click feeling.

Note that, in a case where the pivotal operation of the second step position R2 with respect to the shift lever 2 is released, the shift lever 2 returns to the home position H from a state of the first step position R1. In this case, the shift lever 2 is pivotally shifted in the first pivotal direction (D1 direction) automatically. In other words, the fourth magnetic bodies 14 and 14 are attracted by the permanent magnet section 6, and the fourth movable member 14 is pivoted in the first pivotal direction (D1 direction) accordingly. Further, the third movable member 10 is pivoted by the attraction force with respect to the permanent magnet section 6 as well as the biasing force of the second plate springs 12 and 12, so that the shift lever 2 returns to the home position H.

Next, with reference to FIGS. 4 and 17, explanation will be provided for a case where the shift lever 2 is pivotally shifted in the third pivotal direction (D3 direction).

In order to pivotally shift the shift lever 2 from the home position H illustrated in FIG. 4 to the position M, the shift lever 2 is pivotally shifted in the third pivotal direction (D3 direction). When the shift lever 2 is pivotally shifted in the third pivotal direction (D3 direction), the frame 15 rotates about the shaft sections 17A and 17B, which constitute a second pivotal shaft, in a clockwise direction in FIG. 17. Upon the frame 15 rotating about the shaft sections 17A and 17B in an anticlockwise direction in FIG. 17, the first cam section 8D and the second cam section 13D intermittently move along the surface of the first cam-guiding member 22 and the surface of the second cam-guiding member 23, respectively, against the attraction force between the second magnetic bodies 9 and 9 and the permanent magnet section 6 as well as the attraction force between the fourth magnetic bodies 14 and 14 and the permanent magnet section 6.

In a case where the shift lever 2 is pivotally shifted from the home position H to the position M, the second magnetic bodies 9 and 9 as well as the fourth magnetic bodies 14 and 14 are pushed up against the attraction force with respect to the permanent magnet section 6, and further, the intermittent-driving mechanism 20 works. Thereby, the shift lever 2 is pivotally shifted to the position M with a click feeling.

Note that, in a case where the shift lever 2 returns from the position M to the home position H, the shift lever 2 is pivotally shifted in a direction opposite to the third pivotal direction (D3 direction).

The first cam section 8D is integrally formed with the second movable member 8, and further, the second cam section 13D is integrally formed with the fourth movable member 13. This decreases the number of components. In addition, the intermittent-driving mechanism 20 can be easily assembled.

Note that, in a case where the shift lever 2 is pivotally shifted from the position M to the position M+, the shift lever 2 is pivotally shifted from the position M in the first pivotal direction (D1 direction). Also, in a case where the shift lever 2 is pivotally shifted from the position M to the position M−, the shift lever 2 is pivotally shifted from the position M in the second pivotal direction (D2 direction).

Summary of the Embodiment

In the shift operation device 1 according to the present embodiment, a click feeling is given by a force of moving the first movable member 4 away from the permanent magnet section 6 against the attraction force acting between the first movable member 4 and the permanent magnet section 6, thereby providing the shift lever 2 with the click feeling. A conventional swinging mechanism for giving a click feeling is not required whereby the shift operation device 1 has excellent durability.

Also, in the permanent magnet section 6, an N pole and an S pole created by magnetization in the width direction are close together, and thus density of magnetic flux is increased in a portion in proximity to the N pole and the S pole. Thereby, the magnetic flux efficiently impacts the first movable member 4, so that an attraction force between the first movable member 4 and the permanent magnet section 6 is increased.

(Modifications to Permanent Magnet Section)

Figure 18:
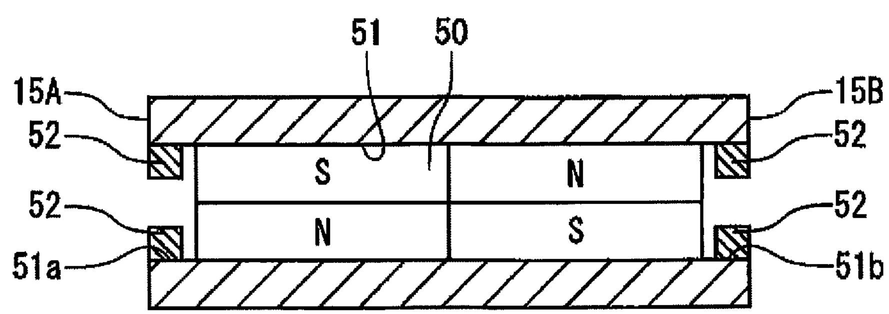
FIG. 18 is a cross sectional side view schematically illustrating modification to the permanent magnet section that constitutes part of the shift operation device illustrating in FIG. 3.

FIG. 18 is a cross sectional side view schematically illustrating modification to the permanent magnet section that constitutes part of the shift operation device 1. A permanent magnet section 50 is a multipolar permanent magnet that is formed to have a plate shape. The permanent magnet section 50 is held by a magnet holding section 51 disposed between a first frame section 15A and a second frame section 15B, which constitute part of the frame 15 in the support 3. In the first frame section 15A, a first magnet-insertion opening 51*a* for inserting the permanent magnet section 50 into the magnet holding section 51 is formed. In the second frame section 15B as well, a second magnet-insertion opening 51*b* for inserting the permanent magnet section 50 into the magnet holding section 51 is formed. In order to prevent the permanent magnet section 50 from coming off the magnet-insertion opening 51*a* or the magnet-insertion opening 51*b*, with respect to each of the magnet-insertion openings 51*a* and 51*b*, coming-off preventing protrusions 52 for securing the permanent magnet section 50 are formed by swaging processing or the like.

The permanent magnet section 50 is magnetized such that an N pole and an S pole are created by magnetization in a series arrangement in a thickness direction pointing to the first movable member 4 (first magnetic body), and such that in a width direction being a width direction intersecting the thickness direction, an S pole is created by magnetization alongside the N pole and an N pole is created by magnetization alongside the S pole created by magnetization in the thickness direction.

For the permanent magnet section 50 having such a configuration as well, in the permanent magnet section 6, the N pole and the S pole created by magnetization in the width direction are close together. Thereby, density of magnetic flux is increased in a portion in proximity to the N pole and the S pole.

In such a manner, the density of magnetic flux is increased in a middle portion of the permanent magnet section 50, and thus the magnetic flux efficiently impacts the first movable member 4 as well. Thereby, the attraction force with respect to the first permanent magnet 6A and the second permanent magnet 6B with either of the first movable member 4 or the second magnetic bodies 9 and 9 is increased. Also, the magnetic flux efficiently impacts the third movable member 10 as well. Thereby, the attraction force with respect to the first permanent magnet 6A and the second permanent magnet 6B with either of the third movable member 10 or the fourth magnetic bodies 14 and 14 is increased. A click sensitivity with respect to the shift lever 2 is increased.

In the vehicular shifting apparatus 100 according to the present embodiment, a click feeling is given by an attraction force with respect to the permanent magnet section 50, and such a click feeling is provided by the shift lever 2. Thereby, the vehicular shifting apparatus 100 has excellent durability. Also, an operation response of the shift lever 2 is increased in the shifting operation.

The present disclosure is not limited to the embodiment. It will be appreciated by those skilled in the art that modifications, combinations, sub-combinations, and alternatives to the components of the foregoing embodiments are made within the scope of the present disclosure or the equivalent thereof.

For example, in the above embodiment, the second movable member 8 and the fourth movable member 13 are pivotally shifted via the first plate springs 7 and 7 and the second plate springs 12 and 12. However, without using the first plate springs 7 and 7 and the second plate springs 12 and 12, the second movable member 8 and the fourth movable member 13 may be pivotally shifted directly via the supporting-block section 18.

Effects of Embodiments

According to the present disclosure, a click feeling is given by a force of moving the first magnetic body against the attraction force acting between the first magnetic body and the permanent magnet section, and such a click feeling is provided by the operation member. Thereby, a conventional swinging mechanism for giving a click feeling is not required, and the shift operation device has excellent durability.

Also, the attraction force acting between the first magnetic body and the permanent magnet section is increased whereby it is possible to provide an operation device, which has a high click sensitivity with respect to the operation member, and a vehicular shifting apparatus using the operation device.

INDUSTRIAL APPLICABILITY

The present disclosure is applicable to various operation devices in which an operation member is pivotally shifted to a predetermined position.

What is claimed is:

1. An operation device that includes an operation member and a support for pivotally supporting the operation member, the support being formed of a non-magnetic member, and the operation member being configured to be pivotally shifted to a predetermined position with a click feeling, the operation device comprising;

a first movable member supported by the support so as to be in conjunction with a pivotal operation of the operation member;

a first magnetic body provided with the first movable member; and a permanent magnet section supported by the support so as to face the first magnetic body when the operation member is at an operation reference position, wherein the permanent magnet section is magnetized such that an N pole and an S pole are created by magnetization in a series arrangement in a thickness direction pointing to the first magnet body, and such that in a width direction intersecting the thickness direction, an S pole is created by magnetization alongside the N pole and an N pole is created by magnetization alongside the S pole created by magnetization in the thickness direction, wherein the operation member is retained at the operation reference position by an attraction force acting between the first magnetic body and the permanent magnet section when the operation member is at the operation reference position, and wherein the movable member positions the first magnetic body away from the permanent magnet section against the attraction force acting between the first magnetic body and the permanent magnet section when the operation member is pivotally shifted from the operation reference position to a first step position, so that the operation member is pivotally shifted to a predetermined position.

2. The operation device according to claim 1, wherein the permanent magnet section includes an individual first permanent magnet in which the N pole and the S pole are created by magnetization in the series arrangement in the thickness direction, and includes an individual second permanent magnet, disposed alongside the first permanent magnet, in which an N pole and an S pole are created by magnetization in a series arrangement in an order opposite the N pole and the S pole, created by magnetization.

3. The operation device according to claim 2, wherein in each of the first permanent magnet and the second permanent magnet, the N pole and the S pole are created by magnetization in the series arrangement in the thickness direction, and wherein the first permanent magnet and the second permanent magnet are arranged in parallel, such that the N poles and S poles are arranged opposite with respect to each other in the thickness direction.

4. The operation device according to claim 2, wherein the first permanent magnet and the second permanent magnet are held in parallel in a magnet holding section mounted on the support.

5. The operation device according to claim 4, wherein the magnet holding section is formed such that a first magnet holding section and a second magnet holding section are separated by a partition-wall section, wherein on the respective opposite sides of the support, a first magnet-insertion opening for inserting the first permanent magnet into the first magnet holding section is formed, and a second magnet-insertion opening for inserting the second permanent magnet into the second magnet holding section is formed, and wherein in a state in which the first permanent magnet and the second permanent magnet attract each other in the width direction through the partition-wall section, the first permanent magnet is held by the first magnet holding section, and the second permanent magnet is held by the second magnet holding section.

6. The operation device according to claim 1, wherein the first movable member is pivotally supported by a first pivotal shaft mounted on the support.

7. The operation device according to claim 1, wherein the operation member is configured to be shifted, from the operation reference position, in a first pivotal direction and in a second pivotal direction opposite to the first pivotal direction, and wherein the first movable member and the first magnetic body are disposed in each of the first pivotal direction and the second pivotal direction, interposing the permanent magnet section.

8. The operation device according to claim 1, further comprising:

a second movable member supported by the support at a location between the first movable member and the permanent magnet section, the second movable member being configured to operate in conjunction with a pivotal operation of the operation member; and a second magnetic body provided with the second movable member so as to face the permanent magnet section, wherein the operation member is retained at the operation reference position by the attraction force acting between the first magnetic body and the permanent magnet section when the operation member is at the operation reference position, and wherein the second movable member positions the second magnetic body away from the permanent magnet section against an attraction force acting between the second magnetic body and the permanent magnet section when the operation member is pivotally shifted in the first pivotal direction or the second pivotal direction, so that the operation member is pivotally shifted to a predetermined position.

9. A vehicular shifting apparatus, comprising:

the operation device according to claim 1;

a control unit configured to transmit a signal to a vehicle-side equipment in response to receiving a signal from the operation device;

a shift knob attached to an operation member of the operation device; and a position detecting unit configured to detect a plurality of positions at which the operation member is positioned.

* * * * *